(12) United States Patent
Gu et al.

(10) Patent No.: US 12,366,933 B2
(45) Date of Patent: Jul. 22, 2025

(54) DISPLAY DEVICE, ELECTRONIC DEVICE AND A POSITION INPUT SYSTEM WITH TOUCH SENSING UNIT, CODE PATTERNS AND REFLECTIVE SURFACE

(71) Applicant: SAMSUNG DISPLAY CO., LTD., Yongin-si (KR)

(72) Inventors: Da Som Gu, Yongin-si (KR); Gil Yeong Park, Yongin-si (KR); Ki Jun Roh, Yongin-si (KR); Sung Guk An, Yongin-si (KR); Hee Young Lee, Yongin-si (KR); So Yeon Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/408,644

(22) Filed: Jan. 10, 2024

(65) Prior Publication Data

US 2024/0338090 A1    Oct. 10, 2024

(30) Foreign Application Priority Data

Apr. 5, 2023  (KR) .................. 10-2023-0044756

(51) Int. Cl.
*G06F 3/041* (2006.01)
*G06F 3/03* (2006.01)

(52) U.S. Cl.
CPC .......... *G06F 3/0412* (2013.01); *G06F 3/0317* (2013.01); *G06F 3/0321* (2013.01)

(58) Field of Classification Search
CPC .... G06F 3/0412; G06F 3/0317; G06F 3/0321; G06F 3/0446
See application file for complete search history.

(56) References Cited

U.S. PATENT DOCUMENTS

| | | | |
|---|---|---|---|
| 2013/0093733 A1* | 4/2013 | Yoshida | G09G 3/30 345/76 |
| 2014/0267944 A1* | 9/2014 | Ikeda | G06F 3/041 359/884 |
| 2016/0124529 A1* | 5/2016 | Yamamoto | G06V 10/17 345/179 |
| 2016/0245968 A1* | 8/2016 | Ichihara | G06V 30/1423 |
| 2017/0123512 A1* | 5/2017 | Gore | G06F 3/03542 |
| 2017/0261661 A1* | 9/2017 | Kiyoto | G02B 5/12 |
| 2021/0318781 A1* | 10/2021 | Van Ostrand | G06F 3/0446 |
| 2022/0011886 A1* | 1/2022 | Choi | G06F 3/03545 |
| 2023/0350511 A1* | 11/2023 | Kim | G06F 3/0443 |

FOREIGN PATENT DOCUMENTS

KR    20-0485305    12/2017

\* cited by examiner

*Primary Examiner* — Liliana Cerullo
(74) *Attorney, Agent, or Firm* — F. CHAU & ASSOCIATES, LLC

(57) ABSTRACT

A display device including: a display unit including a plurality of sub-pixels; a touch sensing unit formed on the display unit and configured to sense a touch position; a code arrangement unit disposed on the touch sensing unit, wherein the code arrangement unit includes code patterns; and a surface protection cover disposed on the code arrangement unit, wherein a distance between the code patterns and a reflective surface formed below the code patterns is equal to or less than 55% of one width of one of the code patterns.

20 Claims, 15 Drawing Sheets

DISPLAY DEVICE, ELECTRONIC DEVICE AND A POSITION INPUT SYSTEM WITH TOUCH SENSING UNIT, CODE PATTERNS AND REFLECTIVE SURFACE

CROSS-REFERENCE TO RELATED APPLICATION

This application claims priority under 35 U.S.C. 119 to Korean Patent Application No. 10-2023-0044756 filed on Apr. 5, 2023 in the Korean Intellectual Property Office, the disclosure of which is incorporated by reference herein in its entirety.

1. TECHNICAL FIELD

The present disclosure relates to a display device and a position input system including the same.

2. DESCRIPTION OF THE RELATED ART

As our information-driven society evolves, the demand for image display devices has surged and diversified. These display devices, which have been applied to various electronic devices such as smartphones, digital cameras, laptops, navigation devices, and smart televisions, often take the form of flat panel displays. These can be liquid crystal display devices, field emission display devices, or organic light emitting display devices. Among such flat panel display devices, light emitting display devices can display images without a backlight unit. This is because each pixel on their display panel includes self-luminous light emitting elements.

Recent display devices accommodate touch inputs both from parts of a user's body, like a finger, and from electronic pens. By using the electronic pen, the display device can detect the touch input more precisely compared to inputs using the user's body.

SUMMARY

Embodiments of the present disclosure provide a display device capable of addressing a ghost phenomenon. This phenomenon occurs when code patterns formed on a display panel and the reflection of these patterns from a rear surface are superimposed, causing them to be mistakenly recognized as a position input device, and a position input system including the same.

According to an embodiment of the disclosure, there is provided a display device including: a display unit including a plurality of sub-pixels; a touch sensing unit formed on the display unit and configured to sense a touch position; a code arrangement unit disposed on the touch sensing unit, wherein the code arrangement unit includes code patterns; and a surface protection cover disposed on the code arrangement unit, wherein a distance between the code patterns and a reflective surface formed below the code patterns is equal to or less than 55% of one width of one of the code patterns.

The code arrangement unit includes: a reflective layer constituting the reflective surface and configured to reflect light applied from above the reflective layer; and a transparent insulating layer disposed on the reflective layer and configured to transmit light applied from above the transparent insulating layer and light reflected from the reflective layer therethrough, and the code patterns are formed on the transparent insulating layer with a preset pattern.

The code arrangement unit further includes a pattern protection layer covering the code patterns, and the pattern protection layer includes at least one single-layer inorganic layer, includes a plurality of inorganic layers that are alternately stacked, includes at least one organic layer, or includes a plurality of organic layers that are stacked.

The code arrangement unit includes first and second grid reference lines orthogonal to each other and intersection points where the first and second grid reference lines intersect with each other, and the code patterns are disposed in any direction from the intersection points.

A height or a thickness of the transparent insulating layer is equal to or less than 55% of one width of one of the code patterns.

The transparent insulating layer is adhered to a front surface of the reflective layer constituting the reflective surface by an adhesive layer, and a sum of a height or a thickness of the transparent insulating layer and a height or a thickness of the adhesive layer is equal to or less than 55% of one width of one of the code patterns.

The reflective layer constituting the reflective surface includes a liquid crystal layer including a plurality of liquid crystals that have the same or different refractive indices.

The reflective layer constituting the reflective surface includes a plurality of organic or inorganic material layers having different refractive indices, includes a plurality of layers in which organic and inorganic material layers having different refractive indices are combined with each other, includes at least one reflective sheet coated with a reflective member made of a metal or a chemical material, or includes at least one metal material layer.

The reflective layer constituting the reflective surface has a mesh shape or a net shape in a plan view in image non-display areas of the display unit such that is does not overlap emission areas of the sub-pixels formed in the display unit and that it surrounds the peripheries of the emission areas of the sub-pixels.

The code arrangement unit includes a transparent insulating layer disposed on touch electrodes formed in the touch sensing unit and configured to transmit light applied from above and light reflected from the touch electrodes therethrough.

A distance between surfaces of the touch electrodes and the code patterns is equal to or less than 55% of one width of one of the code patterns.

A height or a thickness of the transparent insulating layer is equal to or less than 55% of one width of one of the code patterns.

The code arrangement unit further includes a pattern protection layer covering the code patterns, and the pattern protection layer includes at least one single-layer inorganic layer, a plurality of inorganic layers that are alternately stacked, at least one organic layer or a plurality of organic layers that are stacked.

According to an embodiment of the disclosure, there is provided a position input system including: a display device for displaying an image; and a position input device for inputting position coordinate data to the display device, wherein the display device includes: a display unit including a plurality of sub-pixels; a touch sensing unit formed on the display unit and configured to sense a user's touch position; a code arrangement unit including code patterns disposed on the touch sensing unit; and a surface protection cover disposed on the code arrangement unit, and a distance between the code patterns and a reflective surface formed below the code patterns is equal to or less than 55% of one width of one of the code patterns.

The code arrangement unit includes: a reflective layer constituting the reflective surface and configured to reflect light applied from above the reflective layer; and a transparent insulating layer disposed on the reflective layer and configured to transmit light applied from above the transparent insulating layer and light reflected from the reflective layer therethrough, and the code patterns are formed on the transparent insulating layer with a preset pattern.

The reflective layer constituting the reflective surface has a mesh shape or a net shape in a plan view in image non-display areas of the display unit such that is does not overlap emission areas of the sub-pixels formed in the display unit and that it surrounds the peripheries of the emission areas of the sub-pixels.

The code arrangement unit further includes a pattern protection layer covering the code patterns, and the pattern protection layer includes at least one single-layer inorganic layer, a plurality of inorganic layers that are alternately stacked, at least one organic layer, or a plurality of organic layers that are stacked.

The code arrangement unit includes a transparent insulating layer disposed on touch electrodes formed in the touch sensing unit and configured to transmit light applied from above and light reflected from the touch electrodes therethrough.

According to an embodiment of the disclosure, there is provided

With the display device and the position input system including the same according to embodiments of the present disclosure, it is possible to quickly and accurately generate touch coordinate data of a position input device. This is achieved without the need for complicated calculations or corrections, by using code patterns of a display panel. In particular, by adjusting an interval between the code patterns and a reflective surface or a reflective structure formed in a rear surface direction of the code patterns, it is possible to reduce a ghost phenomenon of the code patterns and increase accuracy and reliability in recognizing the code patterns.

BRIEF DESCRIPTION OF THE DRAWINGS

The above and other features of the present disclosure will become more apparent by describing in detail embodiments thereof with reference to the attached drawings, in which.

DETAILED DESCRIPTION OF THE EMBODIMENTS

The present disclosure will now be described more fully hereinafter with reference to the accompanying drawings, in which embodiments of the disclosure are shown. This disclosure may, however, be embodied in different forms and should not be construed as limited to the embodiments set forth herein.

It will be understood that when a layer is referred to as being "on" another layer or substrate, it can be directly on the other layer or substrate, or intervening layers may also be present. The same reference numbers may indicate the same components throughout the specification.

It will be understood that, although the terms "first," "second," etc. may be used herein to describe various elements, these elements should not be limited by these terms. These terms are used to distinguish one element from another element. For instance, a first element discussed below could be termed a second element. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Figure 1:
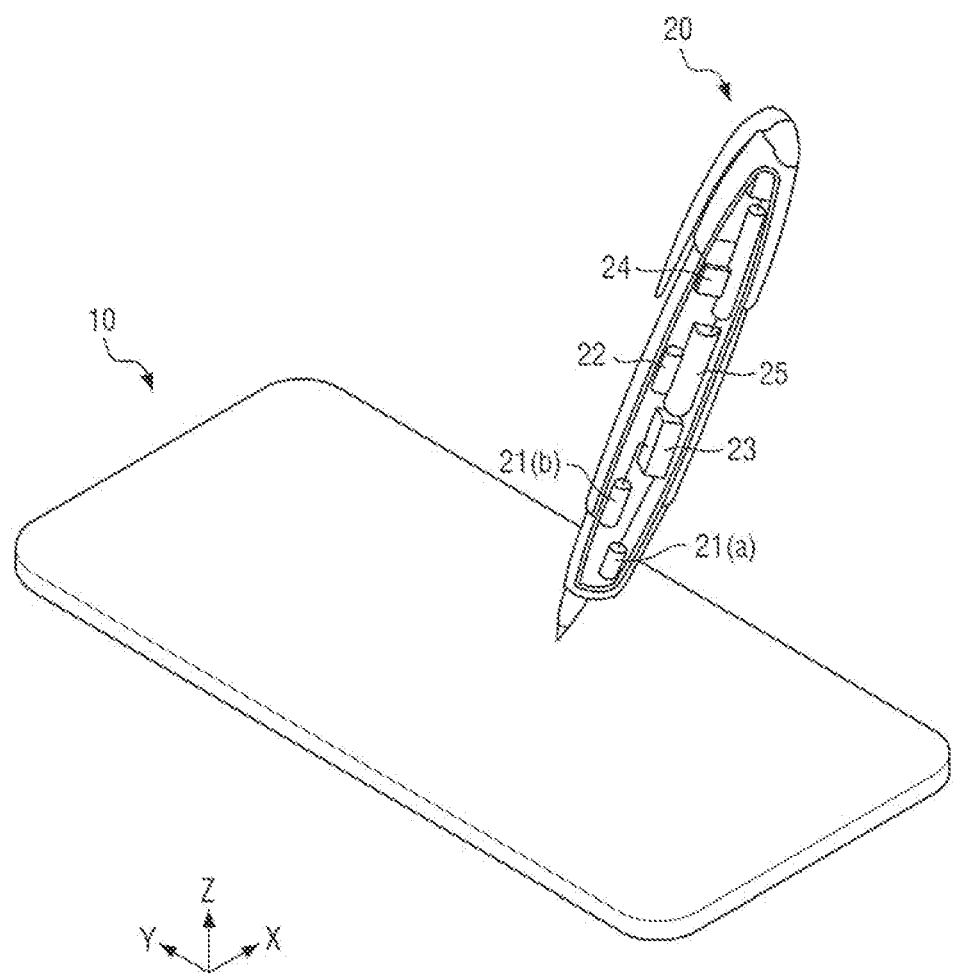
FIG. 1 is a view illustrating a configuration of a position input system according to an embodiment of the present disclosure.

FIG. 1 is a view illustrating a configuration of a position input system according to an embodiment of the present disclosure. In addition, FIG. 2 is a block diagram illustrating a position input device and a display device illustrated in FIG. 1.

Figure 2:
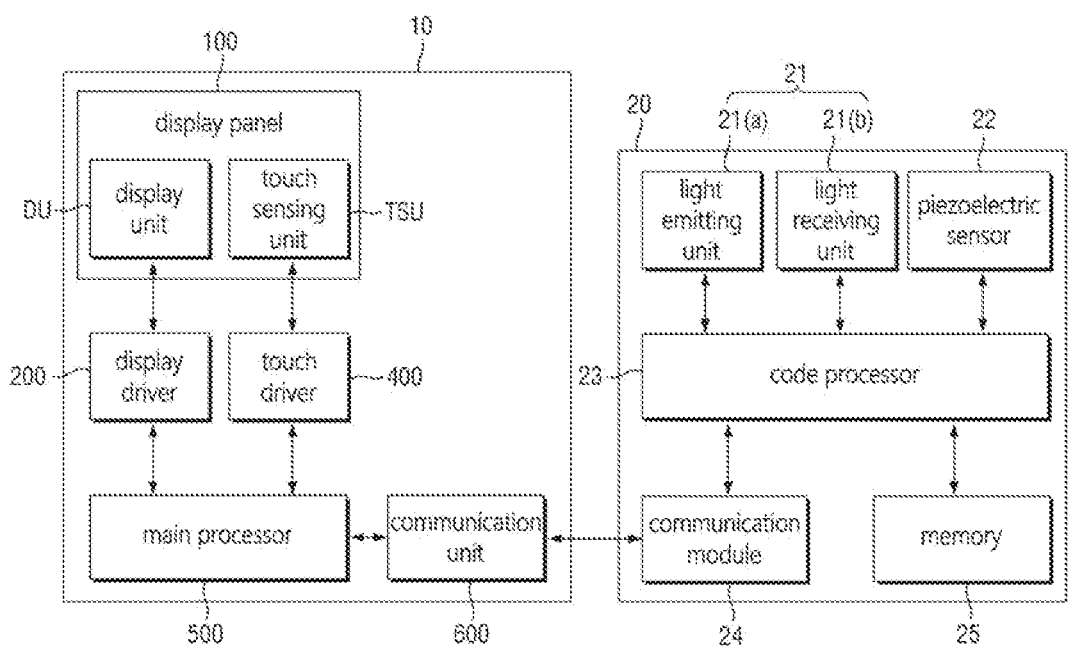
FIG. 2 is a block diagram illustrating a position input device and a display device illustrated in FIG. 1.

Referring to FIGS. 1 and 2, a display device 10 may be applied to portable electronic devices such as smartphones, tablet personal computers (PCs), electronic notebooks, electronic books, portable multimedia players (PMPs), mobile phones, mobile communication terminals, navigation devices, and ultra mobile PCs (UMPCs). As another example, the display device 10 may be applied to wearable devices such as smart watches, watch phones, glasses-type displays, and head mounted displays (HMDs). In addition, the display device 10 may be applied to a display unit of televisions, laptop computers, monitors, billboards, or the Internet of Things (IOTs).

The display device 10 includes a display panel 100, a display driver 200, a touch driver 400, a main processor 500, and a communication unit 600. In addition, a position input device 20 includes a code detection unit 21, a piezoelectric sensor 22, a code processor 23, a communication module 24, and a memory 25.

The display device 10 uses the position input device 20 as a touch input mechanism. The display panel 100 of the display device 10 may include a display unit DU for displaying an image and a touch sensing unit TSU for sensing a body part such as a finger, the position input device 20, and the like. In addition, a code arrangement unit in may be attached to or mounted on a front surface of the touch sensing unit TSU. The code arrangement unit may include code patterns. Here, the code patterns of the code arrangement unit are position code detection patterns that can be sensed by the position input device 20. In addition, the touch sensing unit TSU and the code arrangement unit may also be formed integrally with each other by stacking the code arrangement unit in a front surface direction of the touch sensing unit TSU. As such, the code arrangement unit may be formed integrally with the touch sensing unit TSU on the front surface of the touch sensing unit TSU or may be embedded in the touch sensing unit TSU integrally with the touch sensing unit TSU. On the other hand, the code arrangement unit may be disposed on a front surface of the display unit DU before the touch sensing unit TSU is formed or may be embedded in the display unit DU integrally with the display unit DU. A detailed structure and an arrangement form, an embedded structure, or the like, of such a code arrangement unit will be described later in detail with reference to the accompanying drawings.

The display unit DU of the display panel 100 may include a plurality of pixels and display the image through the plurality of pixels. The code arrangement unit that includes the code patterns may be formed or attached in a front surface direction of the display unit DU. Alternatively, the touch sensing unit TSU may be formed on a front surface portion of the display panel 100.

The touch sensing unit TSU may include a plurality of touch electrodes to sense a touch of a user's body part in a capacitive manner.

The code arrangement unit that includes the code patterns arranged at preset intervals may be disposed on the front surface of the touch sensing unit TSU where the plurality of touch electrodes are located. The code patterns may be disposed in a front surface direction of the touch electrodes to correspond to areas between the pixels formed in the display unit DU. As an example, the code patterns may be formed on an insulating layer or a transparent film to be disposed in the front surface direction of some of the touch electrodes. Here, the code patterns are not directly formed on front surfaces of the touch electrodes, but are formed on a separate transparent film and disposed on the front surface of the touch sensing unit TSU together with the transparent film. In this case, the code patterns may be formed on the transparent film to correspond to the arrangement of the touch electrodes. Formation structures of the code arrangement unit and the code patterns disposed on an upper portion or the front surface of the touch sensing unit TSU may be applied in various structures, and are not limited to any one embodiment. Hereinafter, an example in which the code patterns are formed on the transparent film or an insulating layer and disposed on the front surface of the touch sensing unit TSU together with the transparent film or the insulating layer will be described. Other detailed formation structures of the code patterns will be described later in more detail with reference to the accompanying drawings.

The display driver 200 may output signals and voltages for driving the display unit DU. The display driver 200 may supply data voltages to data lines. The display driver 200 may supply a source voltage to power lines and supply gate control signals to a gate driver.

The touch driver 400 may be connected to the touch sensing unit TSU. The touch driver 400 may supply touch driving signals to the plurality of touch electrodes of the touch sensing unit TSU and detect changes in capacitance between the plurality of touch electrodes. Based on the changes in capacitance between the touch electrodes, the touch driver 400 can determine if a user's touch input occurred and calculate the touch coordinates.

The main processor 500 may control all functions of the display device 10. For example, the main processor 500 may supply digital video data to the display driver 200 so that the display panel 100 displays the image. As an example, the main processor 500 may receive touch data from the touch driver 400 to determine the user's touch coordinates, and then generate digital video data according to the user's touch coordinates. Additionally, the main processor 500 may execute an application indicated by an icon displayed on the user's touch coordinates. As another example, the main processor 500 may receive coordinate data from the position input device 20 to determine touch coordinates of the position input device 20, and then generate digital video data according to the touch coordinates. Additionally, the main processor 500 may execute an application indicated by an icon displayed on the touch coordinates of the position input device 20.

The communication unit 600 may perform wired/wireless communication with an external device. For example, the communication unit 600 may transmit and receive communication signals to and from the communication module 24 of the position input device 20. The communication unit 600 may receive coordinate data composed of data codes from the position input device 20, and may provide the coordinate data to the main processor 500.

The position input device 20 may be used as a touch input mechanism, and may be an electronic pen such as a smart pen. The position input device 20 may be an electronic pen for sensing display light of the display panel 100 or light reflected from the display panel 100 using an optical method, and may detect the code patterns included in the code arrangement unit of the display panel 100 based on the sensed light and generate coordinate data. Such a position input device 20 may be an electronic pen having a writing instrument shape, but is not limited only to a writing instrument shape or structure.

The code detection unit 21 of the position input device 20 is disposed at a position adjacent to a nib part of the position input device 20, and senses the code patterns included in the display panel 100. The code detection unit 21 includes at least one light emitting unit 21 (*a*) for emitting infrared light using at least one infrared light source and at least one light receiving unit 21 (*b*) for detecting infrared light reflected from the code patterns with an infrared camera.

At least one infrared light source included in the light emitting unit 21 (*a*) may be configured as an infrared light emitting diode (LED) array having a matrix structure. In addition, the infrared camera of the light receiving unit 21 (*b*) may include a filter for cutting off wavelength bands other than infrared light and passing infrared light therethrough, a lens system for focusing the infrared light passing through the filter, an optical image sensor for converting an optical image formed by the lens system into an electrical image signal and outputting the electrical image signal. The optical image sensor may be configured as an array having a matrix structure like the infrared LED array, and may provide shape data of the code patterns to the code processor 23 according to shapes and an amount of light reflected from the touch electrodes, the pixels, and the code patterns. As such, the code detection unit 21 of the position input device 20 may continuously detect the code patterns according to a user's control and movement, continuously generate the shape data of the code patterns, and provide the shape data of the code patterns to the code processor 23.

The code processor 23 may continuously receive the shape data of the code patterns from the code detection unit 21. The code processor 23 continuously receives the shape data of the code patterns, identifies their individual shapes and determines the arrangement structure of the code patterns to extract or generate coordinate data. For example, the code processor 23 forms virtual grid reference lines orthogonal to each other when the shape data of the code patterns is received. In addition, the code processor 23 matches intersection points, where the grid reference lines cross orthogonally, with the arrangement positions and the shape data of the code patterns. The code processor 23 then extracts touch position coordinates and coordinate data based on comparison results of the arrangement positions and the shapes of the code patterns. The code processor 23 transmits the coordinate data including the touch position coordinates to the display device 10 through the communication module 24. As such, the code processor 23 may rapidly generate the coordinate data in real time without performing a complicated calculation and correction by continuously generating the touch position coordinates and the coordinate data corresponding to the arrangement positions and the shapes of code patterns.

The piezoelectric sensor 22 senses a user's pressing force applied to any one surface of the position input device 20. The piezoelectric sensor 22 generates an enable signal and transmits the enable signal to the code processor 23 and the communication module 24, during a period in which the pressing force is sensed. The code processor 23 and the communication module 24 may be enabled according to the enable signal from the piezoelectric sensor 22. On the other hand, the piezoelectric sensor 22 may transmit a disable signal to the code processor 23 and the communication module 24 during a disable period in which a pressing force is not sensed.

The communication module 24 may perform wired/wireless communication with an external device. For example, the communication module 24 may transmit and receive communication signals to and from the communication unit 600 of the display device 10. The communication module 24 may receive the coordinate data including the touch position coordinates from the code processor 23, and may provide the coordinate data to the communication unit 600.

The memory 25 may store data required for driving the position input device 20. Touch position coordinates and coordinate data corresponding to arrangement positions, shape images, shape data, and the like, of the code patterns are stored in the memory 25. The memory 25 shares the touch position coordinates and the coordinate data corresponding to the arrangement positions, the shape images, the shape data, or the like, of the code patterns with the code processor 23.

Figure 3:
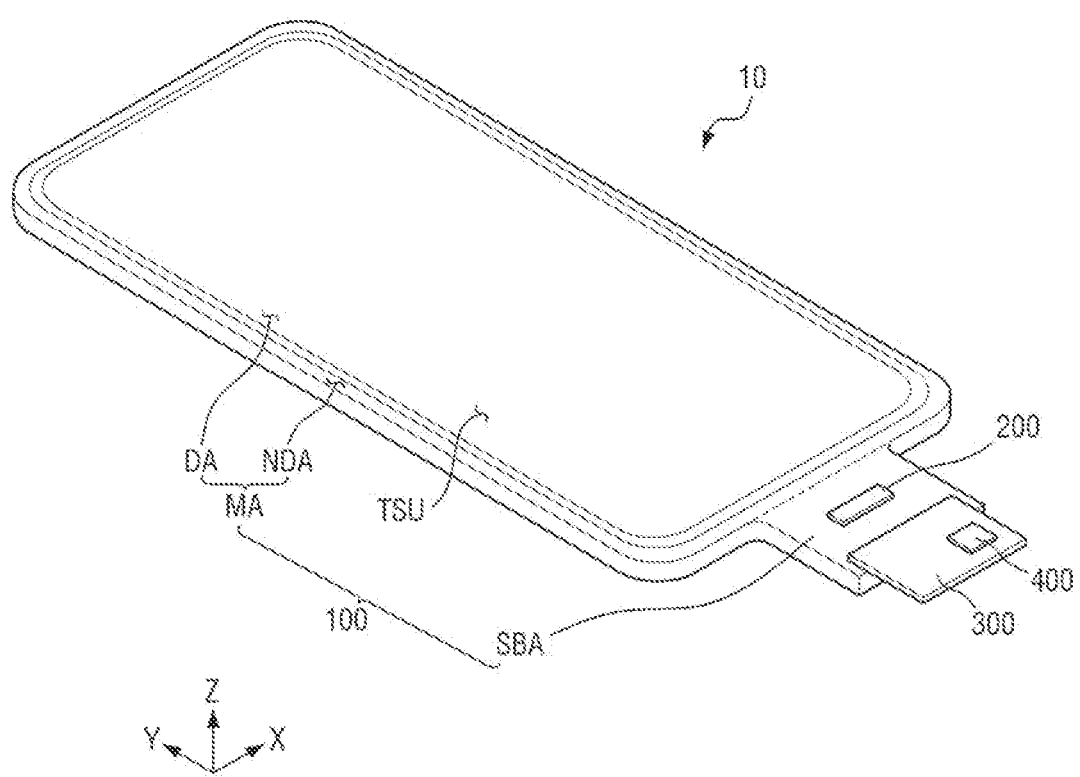
FIG. 3 is a perspective view illustrating a configuration of the display device illustrated in FIG. 2.

FIG. 3 is a perspective view illustrating a configuration of the display device illustrated in FIG. 2. In addition, FIG. 4 is a cross-sectional view illustrating the configuration of the display device illustrated in FIG. 2.

Figure 4:
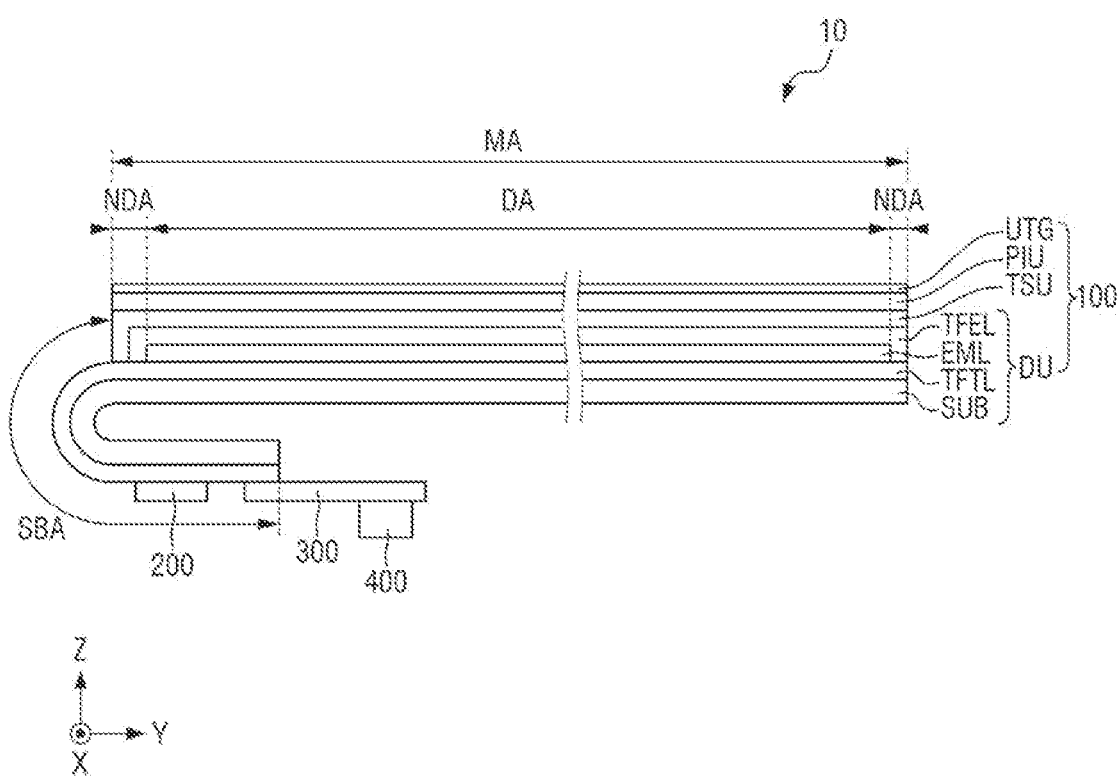
FIG. 4 is a cross-sectional view illustrating the configuration of the display device illustrated in FIG. 2.

Referring to FIGS. 3 and 4, the display device 10 may have a shape similar to a rectangular shape, in a plan view. For example, the display device 10 may have a shape similar to a rectangular shape, in a plan view, having short sides in an X-axis direction and long sides in a Y-axis direction. A corner where the short side in the X-axis direction and the long side in the Y-axis direction meet may be rounded with a predetermined curvature or may be right-angled. The shape of the display device 10 in a plan view is not limited to the rectangular shape, and may be a shape similar to other polygonal shapes, a circular shape, or an elliptical shape.

The display panel 100 may include a main area MA and a sub-area SBA.

The main area MA may include a display area DA including pixels for displaying an image and a non-display area NDA disposed around the display area DA. The display area DA may emit light from a plurality of emission areas or a plurality of opening areas. For example, the display panel 100 may include pixel circuits including switching elements, a pixel defining layer defining the emission areas or the opening areas, and self-light emitting elements.

The non-display area NDA may be an area outside the display area DA. The non-display area NDA may be an edge area of the main area MA of the display panel 100. The non-display area NDA may include a gate driver for supplying gate signals to gate lines, and fan-out lines connecting the display driver 200 and the display area DA to each other.

The sub-area SBA may extend from one side of the main area MA. The sub-area SBA may include a flexible material that may be bent, folded, and rolled. For example, when the sub-area SBA is bent, the sub-area SBA may overlap the main area MA in a thickness direction (Z-axis direction). The sub-area SBA may include the display driver 200 and pad parts connected to a circuit board 300. Alternatively, the sub-area SBA may be omitted, and the display driver 200 and the pad parts may be disposed in the non-display area NDA.

The display driver 200 may be formed as an integrated circuit (IC) and be mounted on the display panel 100 in a chip on glass (COG) manner, a chip on plastic (COP) manner, or an ultrasonic bonding manner. As an example, the display driver 200 may be disposed in the sub-area SBA, and may overlap the main area MA in the thickness direction (Z-axis direction) by bending the sub-area SBA. As another example, the display driver 200 may be mounted on the circuit board 300.

The circuit board 300 may be attached onto the pad parts of the display panel 100 using an anisotropic conductive film (ACF). Lead lines of the circuit board 300 may be electrically connected to the pad parts of the display panel 100. The circuit board 300 may be a flexible printed circuit board, a printed circuit board, or a flexible film such as a chip on film.

The touch driver 400 may be mounted on the circuit board 300. The touch driver 400 may be formed as an integrated circuit (IC). As described above, the touch driver 400 may supply the touch driving signals to the plurality of touch electrodes of the touch sensing unit TSU and sense the change amounts in capacitance between the plurality of touch electrodes. Here, the touch driving signal may be a pulse signal having a predetermined frequency. Based on the changes in capacitance between the touch electrodes, the touch driver 400 can determine if there has been a touch input from the user's body part such as the finger, and then calculate the touch coordinates.

Referring to FIG. 4, the display panel 100 may include the display unit DU, the touch sensing unit TSU, a code arrangement unit PIU, and at least one front surface protection cover UTG. The display unit DU may include a substrate SUB, a thin film transistor layer TFTL, a light emitting element layer EML, and an encapsulation layer TFEL.

The substrate SUB may be a base substrate or a base member. The substrate SUB may be a flexible substrate that may be bent, folded, and rolled. As an example, the substrate SUB may include a glass material or a metal material, but is not limited thereto. As another example, the substrate SUB may include a polymer resin such as polyimide (PI).

The thin film transistor layer TFTL may be disposed on the substrate SUB. For example, parts of the thin film transistor layer TFTL may directly contact the substrate SUB. The thin film transistor layer TFTL may include a plurality of thin film transistors constituting pixel circuits of pixels. The thin film transistor layer TFTL may further include gate lines, data lines, power lines, gate control lines, fan-out lines connecting the display driver 200 and the data lines to each other, and lead lines connecting the display driver 200 and the pad parts to each other. When the gate driver is formed on one side of the non-display area NDA of the display panel 100, the gate driver may also include thin film transistors.

The thin film transistor layer TFTL may be disposed in the display area DA, the non-display area NDA, and the sub-area SBA. The thin film transistors of each of the pixels, the gate lines, the data lines, and the power lines of the thin film transistor layer TFTL may be disposed in the display area DA. The gate control lines and the fan-out lines of the thin film transistor layer TFTL may be disposed in the non-display area NDA. The lead lines of the thin film transistor layer TFTL may be disposed in the sub-area SBA.

The light emitting element layer EML may be disposed on the thin film transistor layer TFTL. The light emitting element layer EML may include a plurality of light emitting elements in which a first electrode, a light emitting layer, and a second electrode are sequentially stacked to emit light and a pixel defining layer for defining pixels. The plurality of light emitting elements of the light emitting element layer EML may be disposed in the display area DA. The light emitting element layer EML may not be disposed in the non-display area NDA. The light emitting layer may be an organic light emitting layer including an organic material. The light emitting layer may include a hole transporting layer, an organic light emitting layer, and an electron transporting layer. When the first electrode receives a predetermined voltage through the thin film transistor of the thin film transistor layer TFTL and the second electrode receives a cathode voltage, holes and electrons may move to the organic light emitting layer through the hole transporting layer and the electron transporting layer, respectively, and may be combined with each other in the organic light emitting layer to emit light. For example, the first electrode may be an anode electrode and the second electrode may be a cathode electrode, but the present disclosure is not limited thereto.

As another example, the plurality of light emitting elements may include quantum dot light emitting diodes including a quantum dot light emitting layer or inorganic light emitting diodes including an inorganic semiconductor.

The encapsulation layer TFEL may cover an upper surface and side surfaces of the light emitting element layer EML, and may protect the light emitting element layer EML. The encapsulation layer TFEL may include at least one inorganic layer and at least one organic layer for encapsulating the light emitting element layer EML. The encapsulation layer TFEL may contact the thin film transistor layer TFTL at sides of the light emitting element layer EML.

The touch sensing unit TSU may be disposed on the encapsulation layer TFEL. The touch sensing unit TSU may include a plurality of touch electrodes for sensing a user's touch in a capacitance manner and touch lines connecting the plurality of touch electrodes and the touch drier 400 to each other. As an example, the touch sensing unit TSU may sense the user's touch using a self-capacitance manner or a mutual capacitance manner.

As another example, the touch sensing unit TSU may be disposed on a separate substrate disposed on the display unit DU. In this case, the substrate supporting the touch sensing unit TSU may be a base member encapsulating the display unit DU.

The plurality of touch electrodes of the touch sensing unit TSU may be disposed in a touch sensor area overlapping the display area DA. The touch lines of the touch sensing unit TSU may be disposed in a touch peripheral area overlapping the non-display area NDA.

The code arrangement unit PIU may be disposed on a front surface of the touch sensing unit TSU, and code patterns are formed at various preset intervals in the code arrangement unit PIU. As an example, the code arrangement unit PIU may include a reflective layer seated in a front surface direction of the touch sensing unit TSU and a transparent insulating layer or a transparent film deposited on or attached to a front surface of the reflective layer. The code arrangement unit PIU may reflect light from a direction facing the front surface direction and side surface directions. In addition, the code arrangement unit PIU further includes code patterns patterned on the transparent insulating layer or the transparent film. Here, the code patterns may cover front surfaces of some touch electrodes with a predetermined area on the transparent insulating layer or the transparent film. In other words, the code patterns may be patterned and formed on the transparent insulating layer or the transparent film to correspond to arrangement positions of the touch electrodes.

In addition, a pattern protection layer shielding the code patterns may be further formed on a front surface of the transparent insulating layer or the transparent film as well as the code patterns. The pattern protection layer may be patterned and formed according to shapes and sizes of the code patterns to cover all of the code patterns. Additionally, the pattern protection layer may be formed to cover the entirety of the front surface of the transparent insulating layer or the transparent film as well as the code patterns. In this case, the pattern protection layer may be made of a transparent protection material. The pattern protection layer may prevent the code patterns made of an infrared light blocking material from being deteriorated by an adhesive material or an adhesive layer to be formed later by covering and shielding all of the code patterns. In other words, the pattern protection layer may prevent chemical component changes and changes over time in the code patterns by covering and shielding all of the code patterns.

An adhesive material or an adhesive layer may be formed on a front surface of the code arrangement unit PIU including the pattern protection layer, and the front surface protection cover UTG may be attached to the front surface of the code arrangement unit PIU by the adhesive material or the adhesive layer.

The sub-area SBA of the display panel 100 may extend from one side of the main area MA. The sub-area SBA may include a flexible material that may be bent, folded, and rolled. For example, when the sub-area SBA is bent, the sub-area SBA may overlap the main area MA in the thickness direction (Z-axis direction). The sub-area SBA may include the display driver 200 and the pad parts connected to the circuit board 300.

Figure 5:
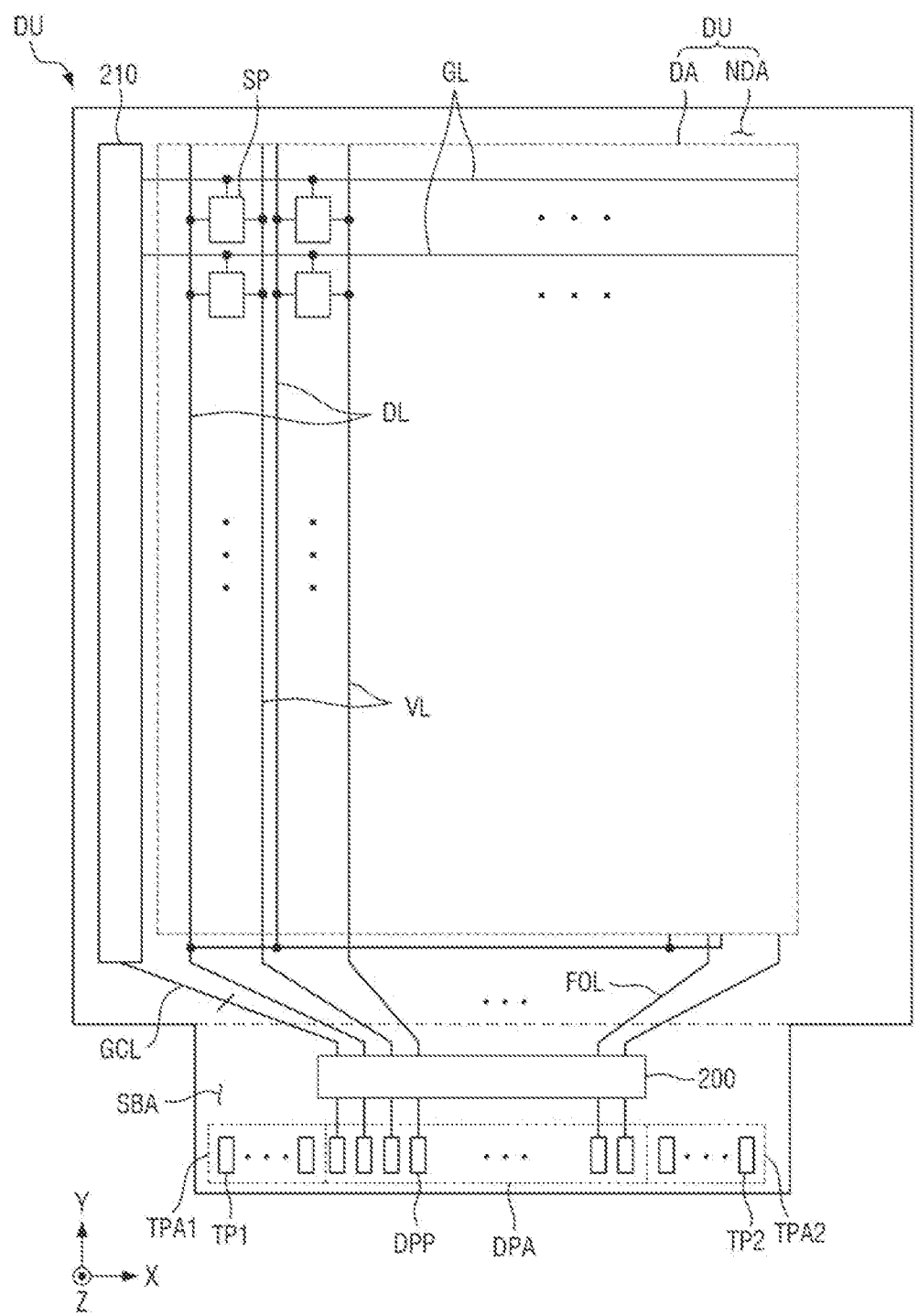
FIG. 5 is a plan view illustrating a display unit of the display device according to an embodiment of the present disclosure.

FIG. 5 is a plan view illustrating a display unit of the display device according to an embodiment of the present disclosure.

Referring to FIG. 5, a display area DA of the display unit DU is an area for displaying an image, and may be a central area of the display panel 100. The display area DA may include a plurality of pixels SP, a plurality of gate lines GL, a plurality of data lines DL, and a plurality of power lines VL. Each of the plurality of pixels SP may be a minimum unit for outputting light.

The plurality of gate lines GL may supply gate signals received from a gate driver 210 to the plurality of pixels SP. The plurality of gate lines GL may extend in the X-axis direction and may be spaced apart from each other in the Y-axis direction crossing the X-axis direction.

The plurality of data lines DL may supply data voltages received from the display driver 200 to the plurality of pixels SP. The plurality of data lines DL may extend in the Y-axis direction and may be spaced apart from each other in the X-axis direction.

The plurality of power lines VL may supply a source voltage received from the display driver 200 to the plurality of pixels SP. Here, the source voltage may be at least one of a driving voltage, an initialization voltage, and a reference voltage. The plurality of power lines VL may extend in the Y-axis direction and may be spaced apart from each other in the X-axis direction.

A non-display area NDA of the display unit DU may surround the display area DA. The non-display area NDA may include the gate driver 210, fan-out lines FOL, and gate control lines GCL. The gate driver 210 may generate a plurality of gate signals based on gate control signals, and may sequentially supply the plurality of gate signals to the plurality of gate lines GL according to a set order.

The fan-out lines FOL may extend from the display driver 200 to the display area DA. The fan-out lines FOL may supply the data voltages received from the display driver 200 to the plurality of data lines DL.

The gate control lines GCL may extend from the display driver 200 to the gate driver 210. The gate control lines GCL may supply the gate control signals received from the display driver 200 to the gate driver 210.

The sub-area SBA may include the display driver 200, a display pad area DPA, and first and second touch pad areas TPA1 and TPA2.

The display driver 200 may output signals and voltages for driving the display panel 100 to the fan-out lines FOL. The display driver 200 may supply the data voltages to the data lines DL through the fan-out lines FOL. The data voltages may be supplied to the plurality of pixels SP, and may determine the luminance of the plurality of pixels SP. The display driver 200 may supply the gate control signals to the gate driver 210 through the gate control lines GCL.

The display pad area DPA, the first touch pad area TPA1, and the second touch pad area TPA2 may be disposed at an edge of the sub-area SBA. The display pad area DPA may be located between the first touch pad area TPA1 and the second touch pad area TPA2. The display pad area DPA, the first touch pad area TPA1, and the second touch pad area TPA2 may be electrically connected to the circuit board 300 using an anisotropic conductive layer or a low-resistance high-reliability material such as a self assembly anisotropic conductive paste (SAP).

The display pad area DPA may include a plurality of display pad parts DPP. The plurality of display pad parts DPP may be connected to the main processor 500 through the circuit board 300. The plurality of display pad parts DPP may be connected to the circuit board 300 to receive digital video data, and may supply the digital video data to the display driver 200.

Figure 6:
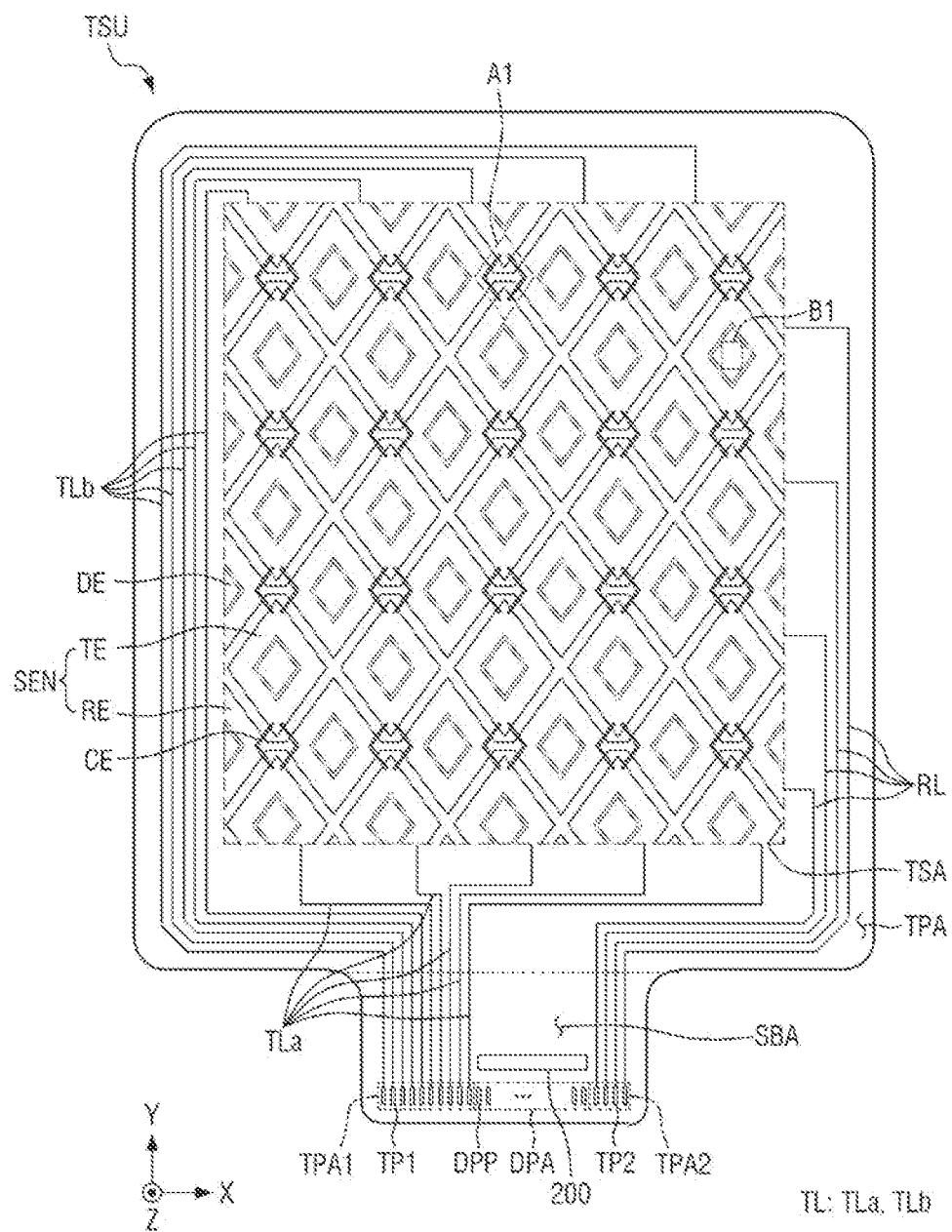
FIG. 6 is a plan view illustrating a touch sensing unit of the display device according to an embodiment of the present disclosure.

FIG. 6 is a plan view illustrating a touch sensing unit of the display device according to an embodiment of the present disclosure.

Referring to FIG. 6, the touch sensing unit TSU may include a touch sensor area TSA for sensing a user's touch and a touch peripheral area TPA disposed around the touch sensor area TSA. The touch sensor area TSA may overlap the display area DA of the display unit DU, and the touch peripheral area TPA may overlap the non-display area NDA of the display unit DU.

The touch sensor area TSA may include a plurality of touch electrodes SEN and a plurality of dummy electrodes DE. The plurality of touch electrodes SEN may form mutual capacitance or self-capacitance to sense a touch of an object or a person. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through a plurality of connection electrodes CE.

The plurality of driving electrodes TE may be connected to first touch pad parts TP1 through driving lines TL. The first touch pad parts TP1 may be located in the first touch pad area TPA1. The driving lines TL may include lower driving lines TLa and upper driving lines TLb. For example, some driving electrodes TE disposed on the lower side of the touch sensor area TSA may be connected to the first touch pad parts TP1 through the lower driving lines TLa, while other driving electrodes TE disposed on the upper side of the touch sensor area TSA may be connected to the first touch pad parts TP1 through the upper driving lines TLb. The lower driving lines TLa may extend to the first touch pad parts TP1 via the lower side of the touch peripheral area TPA. The upper driving lines TLb may extend to the first touch pad parts TP1 via the upper side, the left side, and the lower side of the touch peripheral area TPA. The first touch pad parts TP1 may be connected to the touch driver 400 through the circuit board 300.

The connection electrode CE may be bent at least once. For example, the connection electrode CE may have a clamp shape (e.g., "<" or ">"), but a shape of the connection electrode CE in a plan view is not limited thereto. The driving electrodes TE adjacent to each other in the Y-axis direction may be electrically connected to each other by the plurality of connection electrodes CE, and even when one of the plurality of connection electrodes CE is disconnected, the driving electrodes TE may be stably connected to each other through other connection electrodes CE. The driving electrodes TE adjacent to each other may be connected to each other by two connection electrodes CE, but the number of connection electrodes CE is not limited thereto.

The connection electrodes CE may be disposed at a different layer from the plurality of driving electrodes TE and the plurality of sensing electrodes RE. The sensing electrodes RE adjacent to each other in the X-axis direction may be electrically connected to each other through connection parts disposed at the same layer as the plurality of driving electrodes TE or the plurality of sensing electrodes RE. In other words, the plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other through the connection parts.

The driving electrodes TE adjacent to each other in the Y-axis direction may be electrically connected to each other through the connection electrodes CE disposed at the different layer from the plurality of driving electrodes TE and the plurality of sensing electrodes RE. The connection electrodes CE may be formed at a rear surface layer (or a lower layer) of a layer at which the driving electrodes TE and the sensing electrodes RE are formed. The connection electrodes CE are electrically connected to the respective adjacent driving electrodes TE through a plurality of contact holes. Accordingly, even though the connection electrodes CE overlap the plurality of sensing electrodes RE in the Z-axis direction, the plurality of driving electrodes TE and the plurality of sensing electrodes RE may be insulated from each other. Mutual capacitances may be formed between the driving electrodes TE and the sensing electrodes RE.

The plurality of sensing electrodes RE may be connected to second touch pad parts TP2 through sensing lines RL. For example, some sensing electrodes RE disposed on the right side of the touch sensor area TSA may be connected to the second touch pad parts TP2 through the sensing lines RL. The second touch pad parts TP2 may be located in the second touch pad area TPA2. The sensing lines RL may extend to the second touch pad parts TP2 via the right side and the lower side of the touch peripheral area TPA. The second touch pad parts TP2 may be connected to the touch driver 400 through the circuit board 300.

Each of the plurality of dummy electrodes DE may be surrounded by the driving electrode TE or the sensing electrode RE. Each of the plurality of dummy electrodes DE may be spaced apart and insulated from the driving electrode TE or the sensing electrode RE. Accordingly, the dummy electrode DE may be electrically floated.

The display pad area DPA, the first touch pad area TPA1, and the second touch pad area TPA2 may be disposed at an edge of the sub-area SBA. The display pad area DPA, the first touch pad area TPA1, and the second touch pad area TPA2 may be electrically connected to the circuit board 300 using an anisotropic conductive layer or a low-resistance high-reliability material such as a self assembly anisotropic conductive paste (SAP).

The first touch pad area TPA1 may be disposed on one side of the display pad area DPA, and may include a plurality of the first touch pad parts TP1. The plurality of first touch pad parts TP1 may be electrically connected to the touch driver 400 disposed on the circuit board 300. The plurality of first touch pad parts TP1 may supply the touch driving signals to the plurality of driving electrodes TE through a plurality of the driving lines TL.

The second touch pad area TPA2 may be disposed on the other side of the display pad area DPA, and may include a plurality of the second touch pad parts TP2. The plurality of second touch pad parts TP2 may be electrically connected to the touch driver 400 disposed on the circuit board 300. The touch driver 400 may receive touch sensing signals through a plurality of the sensing lines RL connected to the plurality of second touch pad parts TP2, and may sense a change in mutual capacitance between the driving electrodes TE and the sensing electrodes RE.

As another example, the touch driver 400 may supply a touch driving signal to each of the plurality of driving electrodes TE and the plurality of sensing electrodes RE, and may receive a touch sensing signal from each of the plurality of driving electrodes TE and the plurality of sensing electrodes RE. The touch driver 400 may detect variations in charge across the plurality of driving electrodes TE and the plurality of sensing electrodes RE, using the touch sensing signal.

Figure 7:
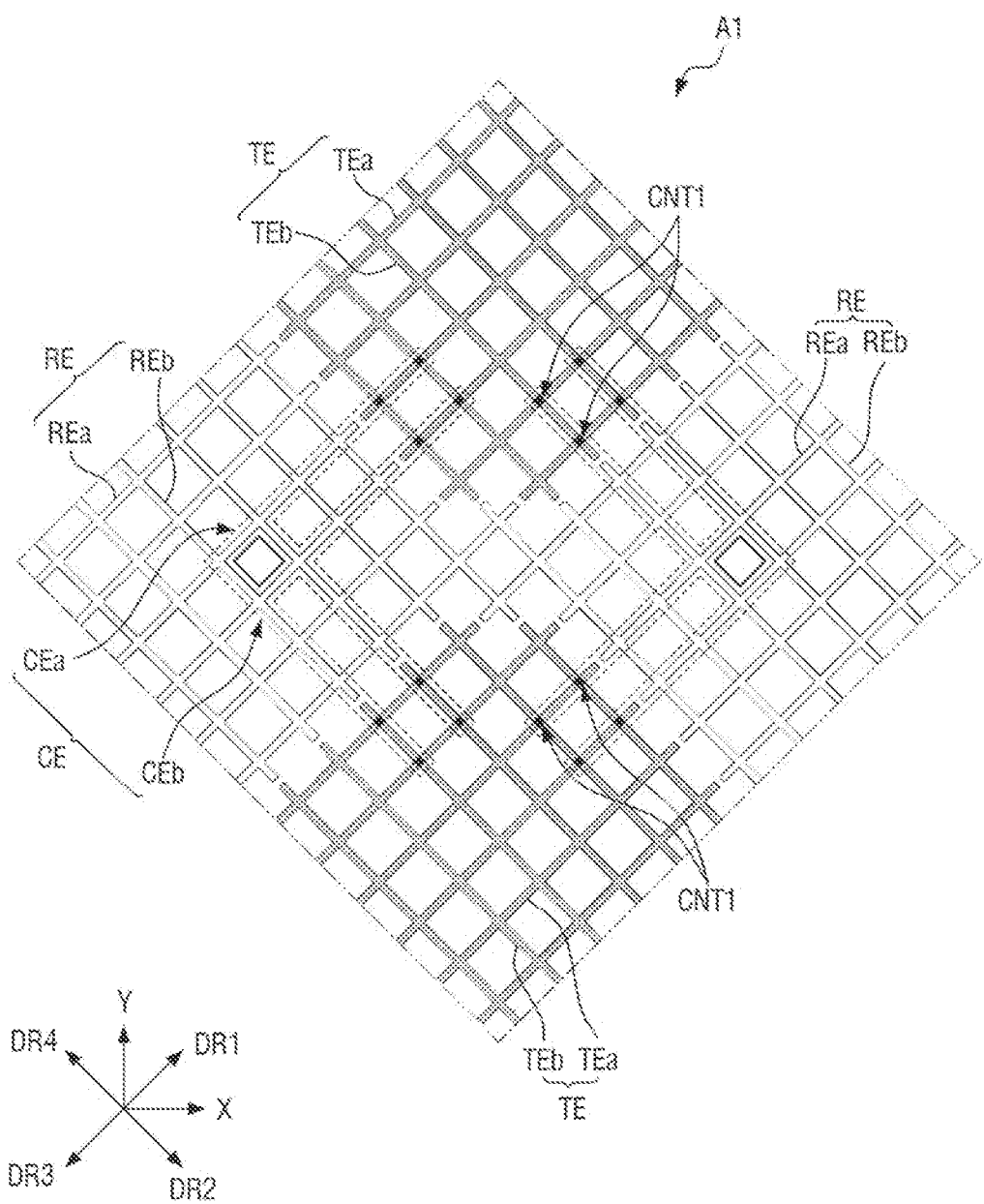
FIG. 7 is an enlarged view illustrating area A1 of FIG. 6.

FIG. 7 is an enlarged view illustrating area A1 of FIG. 6.

Referring to FIG. 7, the plurality of driving electrodes TE, the plurality of sensing electrodes RE, and the plurality of dummy electrodes DE may be disposed at the same layer and may be spaced apart from each other.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through the connection electrodes CE.

The plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other. For example, the sensing electrodes RE may be electrically connected to each other through the connection part, and the connection part may be disposed within the shortest distance between the driving electrodes TE adjacent to each other. In other words, the connection part connecting two adjacent sensing electrode RE may be sandwiched between two adjacent driving electrodes TE.

The plurality of connection electrodes CE may be disposed at a different layer from the driving electrodes TE and the sensing electrodes RE, for example, a rear surface layer. The connection electrode CE may include a first portion CEa and a second portion CEb. For example, the first portion CEa of the connection electrode CE may be connected to the driving electrode TE disposed on one side through a first contact hole CNT1 and may extend in a third direction DR3. The second portion CEb of the connection electrode CE may be bent from the first portion CEa in an area where the second portion CEb overlaps the sensing electrode RE, may extend in a second direction DR2, and may be connected to the driving electrode TE disposed on another side through a first contact hole CNT1. Hereinafter, a first direction DR1 may be a direction between the X-axis direction and the Y-axis direction, the second direction DR2 may be a direction between a direction opposite to the Y-axis direction and the X-axis direction, the third direction DR3 may be a direction opposite to the first direction DR1, and a fourth direction DR4 may be a direction opposite to the second direction DR2. Accordingly, each of the plurality of connection electrodes CE may connect the driving electrodes TE adjacent to each other in the Y-axis direction to each other.

Each of the plurality of driving electrodes TE may include a first portion TEa extending in the first direction DR1 and a second portion TEb extending in the second direction DR2, and may not overlap emission areas of respective sub-pixels. In addition, each of the plurality of sensing electrodes RE may include a first portion REa extending in the first direction DR1 and a second portion REb extending in the second direction DR2, and may be disposed so as not to overlap the emission areas of the respective sub-pixels.

Figure 8:
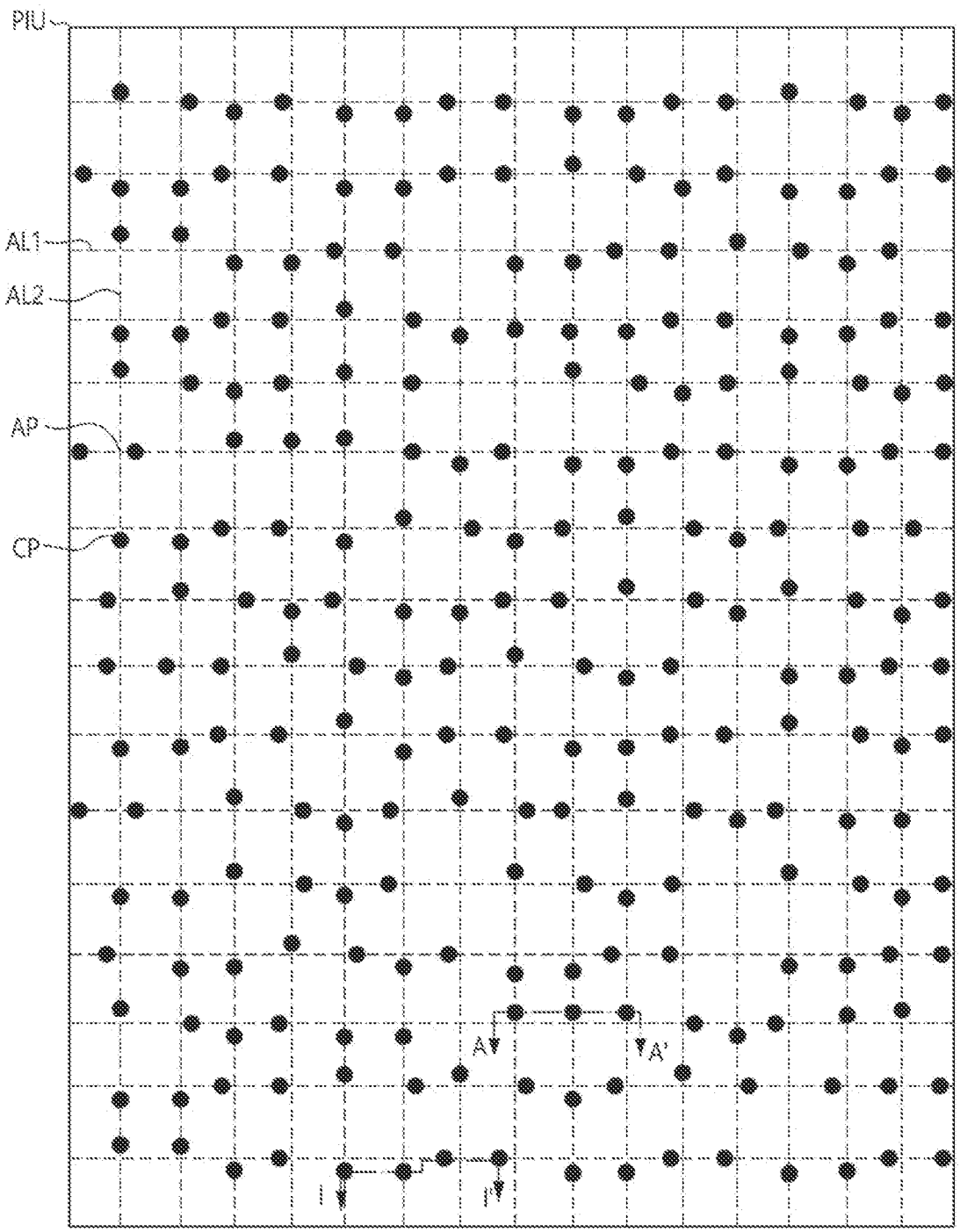
FIG. 8 is an enlarged view illustrating a code arrangement unit and a code pattern arrangement structure of the code arrangement unit of the display device according to an embodiment of the present disclosure.

FIG. 8 is an enlarged view illustrating a code arrangement unit and a code pattern arrangement structure of the code arrangement unit of the display device according to an embodiment of the present disclosure.

Referring to FIG. 8, the code arrangement unit PIU includes code patterns CP disposed at preset specific positions according to a preset position code shape. In other words, the code arrangement unit PIU includes code patterns CP placed at predetermined positions based on a predetermined position code shape.

The code arrangement unit PIU may be formed or disposed in a front surface direction of the touch sensor area TSA to correspond to the display unit DU of the display panel 100 and the touch sensor area TSA of the touch sensing unit TSU. In this case, the code patterns CP may be formed at preset positions on a transparent insulating layer or a transparent film according to the preset position code shape, and may be disposed to cover front surfaces of some touch electrodes SEN with a predetermined area.

Virtual first and second grid reference lines AL1 and AL2 orthogonal to each other and intersection points AP where the first and second grid reference lines AL1 and AL2 intersect with each other may be provided in the code arrangement unit PIU. Intervals between the virtual first and second grid reference lines AL1 and AL2 may be preset to be the same as each other or may be preset to be different from each other in any one of the X-axis direction or the Y-axis direction. Accordingly, based on the present position code shape, the code patterns CP of the code arrangement unit PIU may be disposed in any direction from the intersection points AP where the virtual first and second grid reference lines AL1 and AL2 orthogonal to each other intersect. In other words, the code patterns CP may be respectively disposed in X-axis, −X-axis, Y-axis, and −Y-axis directions (or up, down, left, and right directions) of their respective intersection points AP, based on the preset position code shape. Accordingly, when shape data of the code patterns CP are generated through the light receiving unit 21 (b) of the code detection unit 21, the code processor 23 of the position input device 20 forms the virtual first and second grid reference lines AL1 and AL2. In addition, the code processor 23 of the position input device 20 may extract a position code shape by matching the intersection points AP to arrangement positions and shape data of the code patterns CP, and extract touch position coordinates and coordinate data for each position code shape.

Figure 9:
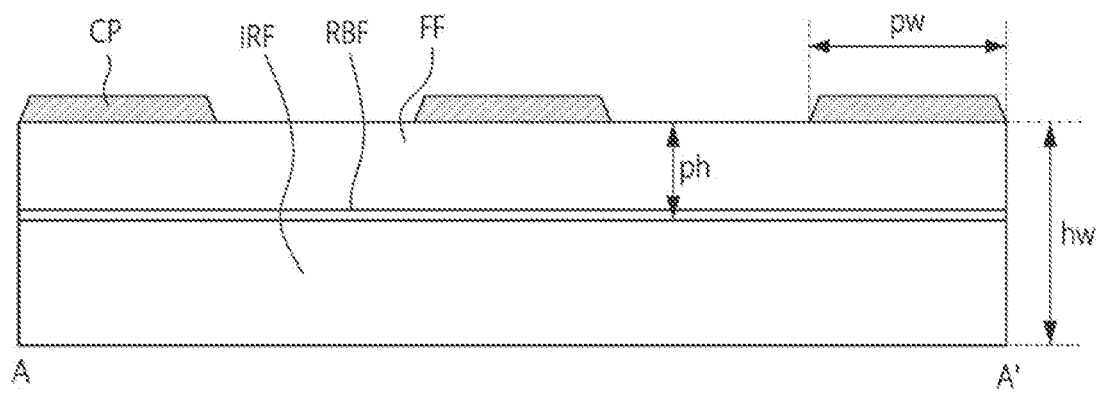
FIG. 9 is a cross-sectional view illustrating a cross section, taken along line A-A', of the code arrangement unit of FIG. 8.

FIG. 9 is a cross-sectional view illustrating a cross section, taken along line A-A', of the code arrangement unit of FIG. 8.

Referring to FIG. 9, the code arrangement unit PIU disposed on the front surface of the touch sensing unit TSU includes a reflective layer IRF, an adhesive layer RBF, a transparent insulating layer FF, and the code patterns CP.

The reflective layer IRF is disposed in a front surface direction of the touch sensing unit TSU, and reflects light applied in the front surface direction at an angle of reflection corresponding to an angle of incidence of the light. The reflective layer IRF may include an organic or inorganic material layer including birefringent materials having the same or different refractive indices. Alternatively, the reflective layer IRF may include organic or inorganic material layers having different refractive indices. Alternatively, the reflective layer IRF may include a reflective sheet coated with a reflective substrate made of a reflective material or may have a form in which a plurality of sheets having different refractive indices are stacked. A detailed structure of the reflective layer IRF will be described later in detail with reference to the accompanying drawings.

The adhesive layer RBF may be coated on or applied onto a front surface of the reflective layer IRF. Accordingly, the transparent insulating layer FF is disposed in a front surface direction of the reflective layer IRF and transmits light applied in the front surface direction and light reflected from the reflective layer IRF therethrough. The transparent insulating layer FF may be adhered and attached in the front surface direction of the reflective layer IRF by the adhesive layer RBF. The transparent insulating layer FF may include an inorganic material layer or may include a transparent film or sheet.

The code patterns CP are formed on the transparent insulating layer FF based on the preset position code shape. For example, based on the preset position code shape, the code patterns CP can be placed in any direction from the intersection points AP, where the virtual first and second grid reference lines AL1 and AL2, which are orthogonal to each other, intersect.

Referring to FIG. 9, rear surface shapes of the code patterns CP may be reflected from a surface of the reflective layer IRF according to a distance ph between the surface of the reflective layer IRF and the code patterns CP, and the reflected shapes may be recognized as the code patterns CP by the position input device 20. In other words, the position input device 20 may recognize position codes of distorted shapes by recognizing both the code patterns CP disposed on the transparent insulating layer FF and rear surface reflected images of the code patterns CP reflected from the surface of the reflective layer IRF.

Reflected ghost images of the code patterns CP are generated based on the distance ph between the surface of the reflective layer IRF and the code patterns CP. As an example, as the distance ph between the surface of the reflective layer IRF and the code patterns CP becomes equal to at least one width pw of the code patterns CP or becomes greater than at least one width pw of the code patterns CP, more ghost images may be generated. In other words, the larger the distance ph between the surface of the reflective layer IRF and the code patterns CP, the greater the chance of ghost images being formed. Accordingly, as the distance ph between the surface of the reflective layer IRF and the code patterns CP becomes smaller than at least one width pw of the code patterns CP, fewer ghost images may be generated.

Referring to FIG. 9, to minimize the amount of reflected images of the code patterns CP, which are reflected from the surface of the reflective layer IRF, the distance ph between the surface of the reflective layer IRF and the code patterns CP may be equal to or less than 55% of at least one width pw of the code patterns CP. This is expressed by Equation 1 as follows:

$$ph \leq pw \times 0.55. \qquad \text{[Equation 1]}$$

To accomplish this, the sum of a height (or a thickness) of the transparent insulating layer FF and a height (or a thickness) of the adhesive layer RBF may be equal to or less than 55% of one width pw of the code patterns CP. Here, at least one width pw of the code patterns CP may be the same as or smaller than a total height hw (e.g., thickness) of the code arrangement unit PIU.

Figure 10:
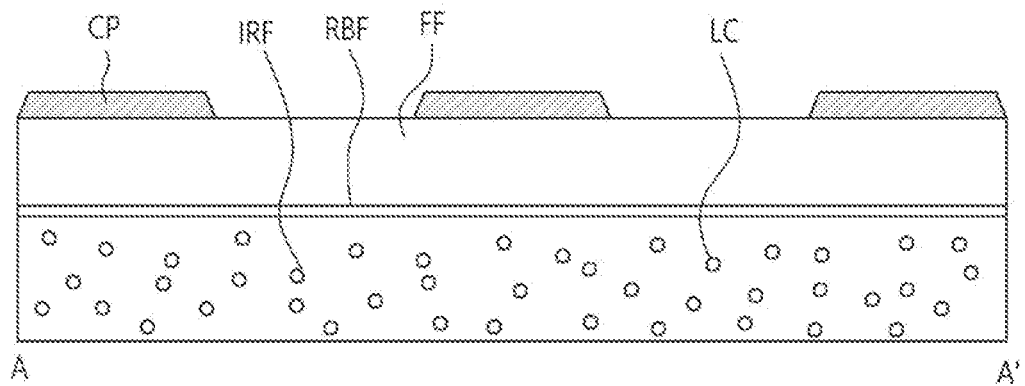
FIG. 10 is a cross-sectional view illustrating a cross section, taken along line A-A', of the code arrangement unit of FIG. 8 according to a first embodiment of the present disclosure.

FIG. 10 is a cross-sectional view illustrating a cross section, taken along line A-A', of the code arrangement unit of FIG. 8 according to a first embodiment of the present disclosure.

Referring to FIG. 10, the reflective layer IRF of the code arrangement unit PIU disposed on the front surface of the touch sensing unit TSU reflects light applied in a front surface direction thereof at an angle of reflection according to an angle of incidence. To accomplish this, the reflective layer IRF may include a liquid crystal layer including birefringent materials having the same or different refractive indices, for example, a plurality of liquid crystals LC. Here, the plurality of liquid crystals LC are formed to maintain respective gradients preset by an alignment layer, photocuring characteristics, or the like, and reflect light applied in a front surface direction at an angle of reflection according to an angle of incidence of the light.

To minimize the number of reflected images of the code patterns CP, which are reflected from the surface of the reflective layer IRF, the distance ph between the surface of the reflective layer IRF including the liquid crystal layer and the code patterns CP may be equal to or less than 55% of any one width pw of the code patterns CP.

Figure 11:
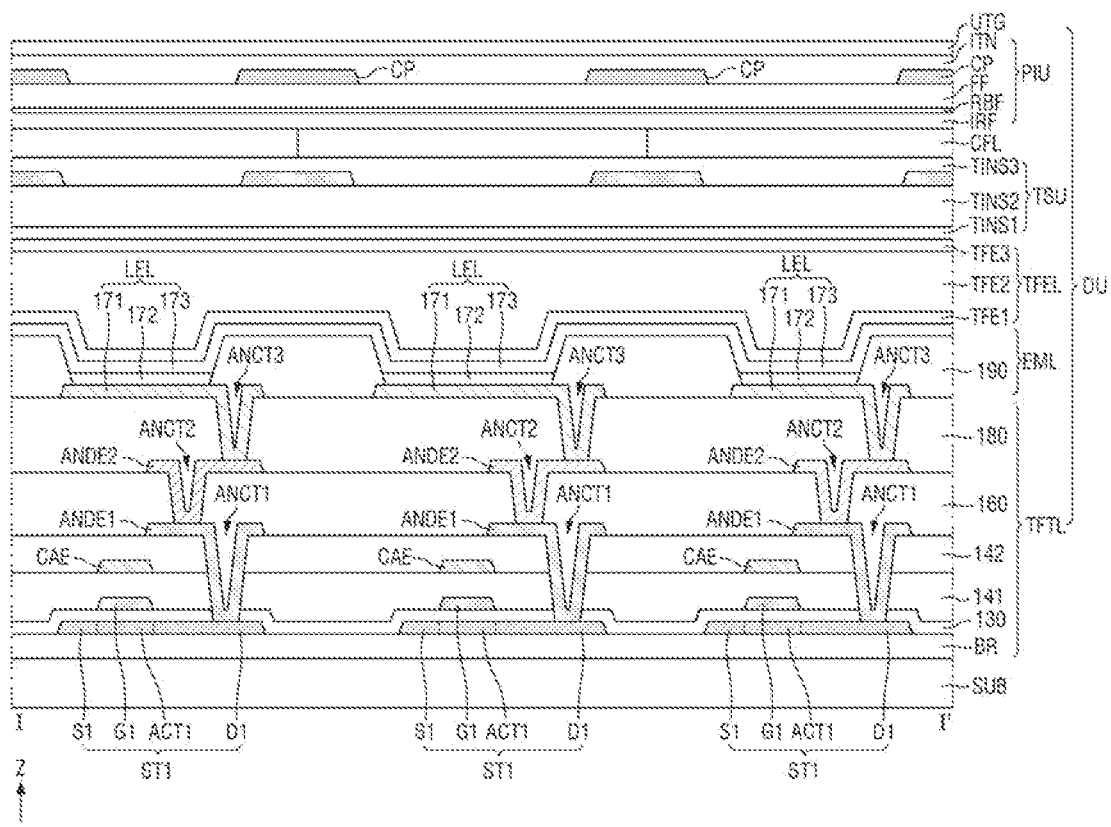
FIG. 11 is a cross-sectional view illustrating cross sections, taken along line I-I' of FIG. 8, of the display unit, the touch sensing unit, and the code arrangement unit according to an embodiment of the present disclosure.

FIG. 11 is a cross-sectional view illustrating cross sections, taken along line I-I' of FIG. 8, of the display unit, the touch sensing unit, and the code arrangement unit according to an embodiment of the present disclosure. In addition, FIG. 12 is a cross-sectional view illustrating a cross-sectional structure taken along line I-I' of FIG. 11 in a block form.

Figure 12:
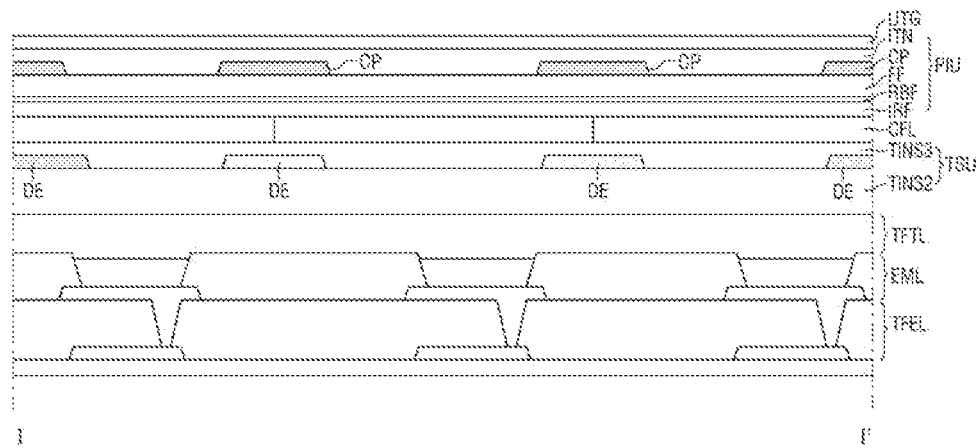
FIG. 12 is a cross-sectional view illustrating a cross-sectional structure taken along line I-I' of FIG. 11 in a block form.

Referring to FIGS. 11 and 12, a barrier layer BR may be disposed on the substrate SUB. The substrate SUB may be made of an insulating material such as a polymer resin. For example, the substrate SUB may be made of polyimide. The substrate SUB may be a flexible substrate that may be bent, folded, and rolled.

The barrier layer BR is a film for protecting transistors of the thin film transistor layer TFTL and light emitting layers 172 of the light emitting element layer EML from moisture permeating through the substrate SUB. The barrier layer BR may include a plurality of inorganic layers that are alternately stacked. For example, the barrier layer BR may be formed as multiple layers in which one or more inorganic layers of a silicon nitride layer, a silicon oxynitride layer, a silicon oxide layer, a titanium oxide layer, and an aluminum oxide layer are alternately stacked.

Thin film transistors ST1 may be disposed on the barrier layer BR Each of the thin film transistors ST1 includes an active layer ACT1, a gate electrode G1, a source electrode S1, and a drain electrode DI.

The active layer ACT1, the source electrode S1, and the drain electrode DI of each of the thin film transistors ST1 may be disposed on the barrier layer BR. For example, the active layer ACT1, the source electrode S1, and the drain electrode DI of each of the thin film transistors ST1 may directly contact the barrier layer BR. The active layer ACT1 of the thin film transistor ST1 includes polycrystalline silicon, single crystal silicon, low-temperature polycrystalline silicon, amorphous silicon, or an oxide semiconductor. The active layer ACT1 overlapping the gate electrode G1 in the Z-axis direction, which is a thickness direction of the substrate SUB, may be a channel region. The source electrode S1 and the drain electrode DI are regions that do not overlap the gate electrode G1 in the Z-axis direction, and may have conductivity by doping a silicon semiconductor or an oxide semiconductor with ions or impurities.

A gate insulating layer 130 may be disposed on the active layer ACT1, the source electrode S1, and the drain electrode DI of each of the thin film transistors ST1. The gate insulating layer 130 may be formed as an inorganic layer such as a silicon nitride layer, a silicon oxynitride layer, a silicon oxide layer, a titanium oxide layer, or an aluminum oxide layer.

The gate electrode G1 of the thin film transistor ST1 may be disposed on the gate insulating layer 130. The gate electrode G1 may overlap the active layer ACT1 in the Z-axis direction. The gate electrode G1 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A first interlayer insulating layer 141 may be disposed on the gate electrode G1 of the thin film transistor ST1. The first interlayer insulating layer 141 may cover the gate electrode G1 of the thin film transistor ST1 and the gate insulating layer 130. The first interlayer insulating layer 141 may be formed as an inorganic layer such as a silicon nitride layer, a silicon oxynitride layer, a silicon oxide layer, a titanium oxide layer, or an aluminum oxide layer. The first interlayer insulating layer 141 may be formed as a plurality of inorganic layers.

Capacitor electrodes CAE may be disposed on the first interlayer insulating layer 141. The capacitor electrode CAE may overlap the gate electrode G1 of the first thin film transistor ST1 in the Z-axis direction. Since the first interlayer insulating layer 141 has a predetermined dielectric constant, a capacitor may be formed by the capacitor electrode CAE, the gate electrode G1, and the first interlayer insulating layer 141 disposed between the capacitor electrode CAE and the gate electrode G1. The capacitor electrode CAE may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A second interlayer insulating layer 142 may be disposed on the capacitor electrodes CAE. The second interlayer insulating layer 142 may be formed as an inorganic layer such as a silicon nitride layer, a silicon oxynitride layer, a silicon oxide layer, a titanium oxide layer, or an aluminum oxide layer. The second interlayer insulating layer 142 may be formed as a plurality of inorganic layers.

First anode connection electrodes ANDE1 may be disposed on the second interlayer insulating layer 142. The first anode connection electrode ANDE1 may be connected to the drain electrode DI of the thin film transistor ST1 through a first connection contact hole ANCT1 penetrating through the gate insulating layer 130, the first interlayer insulating layer 141, and the second interlayer insulating layer 142. The first anode connection electrode ANDE1 may make direct contact with the drain electrode DI of the thin film transistor ST1. The first anode connection electrode ANDE1 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A first planarization layer 160 for planarizing a step due to the thin film transistors ST1 may be disposed on the first anode connection electrodes ANDE1. The first planarization layer 160 may be formed as an organic layer made of an acrylic resin, an epoxy resin, a phenolic resin, a polyamide resin, a polyimide resin, or the like.

Second anode connection electrodes ANDE2 may be disposed on the first planarization layer 160. The second anode connection electrode ANDE2 may be connected to the first anode connection electrode ANDE1 through a second connection contact hole ANCT2 penetrating through the first planarization layer 160. The second anode connection electrode ANDE2 may be directly connected to the first anode connection electrode ANDE1. The second anode connection electrode ANDE2 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A second planarization layer 180 may be disposed on the second anode connection electrodes ANDE2. The second planarization layer 180 may be formed as an organic layer made of an acrylic resin, an epoxy resin, a phenolic resin, a polyamide resin, a polyimide resin, or the like.

Light emitting elements LEL and a bank 190 may be disposed on the second planarization layer 180. Each of the light emitting elements LEL includes a pixel electrode 171, a light emitting layer 172, and a common electrode 173.

The pixel electrode 171 may be disposed on the second planarization layer 180. The pixel electrode 171 may be connected to the second anode connection electrode ANDE2 through a third connection contact hole ANCT3 penetrating through the second planarization layer 180. The pixel electrode 171 may be directly connected to the second anode connection electrode ANDE2.

In a top emission structure in which light is emitted toward the common electrode 173 based on the light emitting layer 172, the pixel electrode 171 may be made of a metal material having high reflectivity, such as a stacked structure (Ti/Al/Ti) of aluminum and titanium, a stacked structure (ITO/Al/ITO) of aluminum and indium tin oxide (ITO), an APC alloy, and a stacked structure (ITO/APC/ITO) of an APC alloy and ITO. The APC alloy is an alloy of silver (Ag), palladium (Pd), and copper (Cu).

The bank 190 may be formed to partition the pixel electrodes 171 on the second planarization layer 180 to define an emission area for each pixel SP. The bank 190 may be disposed to cover edges of the pixel electrodes 171. The bank 190 may overlap the third connection contact hole ANCT3. The bank 190 may be formed as an organic layer made of an acrylic resin, an epoxy resin, a phenolic resin, a polyamide resin, a polyimide resin, or the like.

Each emission area refers to an area in which the pixel electrode 171, the light emitting layer 172, and the common electrode 173 are sequentially stacked and holes from the pixel electrode 171 and electrons from the common electrode 173 are combined with each other in the light emitting layer 172 to emit light.

The light emitting layer 172 may be disposed on the pixel electrode 171 and the bank 190. The light emitting layer 172 may include an organic material to emit light of a predetermined color. For example, the light emitting layer 172 includes a hole transporting layer, an organic material layer, and an electron transporting layer.

The common electrode 173 may be disposed on the light emitting layer 172. The common electrode 173 may cover the light emitting layer 172. The common electrode 173 may be a common layer formed in common in the respective emission areas. A capping layer may be formed on the common electrode 173.

In the top emission structure, the common electrode 173 may be made of a transparent conductive material (TCO) such as ITO or indium zinc oxide (IZO) capable of transmitting light therethrough or a semi-transmissive conductive material such as magnesium (Mg), silver (Ag), or an alloy of magnesium (Mg) and silver (Ag). When the common electrode 173 is made of the semi-transmissive conductive material, emission efficiency may be increased by a micro cavity.

The encapsulation layer TFEL may be disposed on the common electrode 173. The encapsulation layer TFEL includes at least one inorganic layer to prevent oxygen or moisture from permeating into the light emitting element layer EML. In addition, the encapsulation layer TFEL includes at least one organic layer to protect the light emitting element layer EML from foreign substances such as dust. For example, the encapsulation layer TFEL includes a first encapsulation inorganic layer TFE1, an encapsulation organic layer TFE2, and a second encapsulation inorganic layer TFE3.

The first encapsulation inorganic layer TFE1 may be disposed on the common electrode 173, the encapsulation organic layer TFE2 may be disposed on the first encapsulation inorganic layer TFE1, and the second encapsulation inorganic layer TFE3 may be disposed on the encapsulation organic layer TFE2. The first encapsulation inorganic layer TFEL and the second encapsulation inorganic layer TFE3 may be formed as multiple layers in which one or more inorganic layers of a silicon nitride layer, a silicon oxynitride layer, a silicon oxide layer, a titanium oxide layer, and an aluminum oxide layer are alternately stacked. The encapsulation organic layer TFE2 may be an organic layer made of an acrylic resin, an epoxy resin, a phenolic resin, a polyamide resin, a polyimide resin, or the like.

The touch sensing unit TSU illustrated in FIG. 6 may be disposed on the encapsulation layer TFEL. The touch sensing unit TSU includes a first touch insulating layer TINS1, the connection electrodes CE, a second touch insulating layer TINS2, the driving electrodes TE, the sensing electrodes RE, the dummy electrodes DE, and a third touch insulating layer TINS3.

The first touch insulating layer TINS1 may be formed as an inorganic layer such as a silicon nitride layer, a silicon oxynitride layer, a silicon oxide layer, a titanium oxide layer, or an aluminum oxide layer.

The connection electrodes CE may be disposed on the first touch insulating layer TINS1. The connection electrode CE may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

The second touch insulating layer TINS2 is disposed on the first touch insulating layer TINS1 as well as the connection electrodes CE. The second touch insulating layer TINS2 may be formed as an inorganic layer such as a silicon nitride layer, a silicon oxynitride layer, a silicon oxide layer, a titanium oxide layer, or an aluminum oxide layer. Alternatively, the second touch insulating layer TINS2 may be formed as an organic layer made of an acrylic resin, an epoxy resin, a phenolic resin, a polyamide resin, a polyimide resin, or the like.

The dummy electrodes DE, the driving electrodes TE, and the sensing electrodes RE may be disposed on the second touch insulating layer TINS2. In addition, the lower driving lines TLa, the upper driving lines TLb, and the sensing lines RL illustrated in FIG. 6 may be disposed on the second touch insulating layer TINS2.

The driving electrodes TE, the sensing electrodes RE, and the dummy electrodes DE are formed as conductive metal electrodes, which are made of any one of molybdenum (Mo), aluminum (Al), chromium (Cr), gold (Au), titanium (Ti), nickel (Ni), neodymium (Nd), and copper (Cu), or alloys thereof. The driving electrodes TE, the sensing electrodes RE, and the dummy electrodes DE are formed in a mesh structure or a net structure so as not to overlap the emission areas. Each driving electrode TE and sensing electrode RE may partially overlap the connection electrode CE in the Z-axis direction. In this case, the driving electrode TE may be connected to the connection electrode CE through a touch contact hole penetrating through the second touch insulating layer TINS2.

The third touch insulating layer TINS3 is formed on the second touch insulating layer TINS2 as well as the dummy electrodes DE, the driving electrodes TE, and the sensing electrodes RE. The third touch insulating layer TINS3 may serve to planarize a step formed due to the driving electrodes TE, the sensing electrodes RE, and the connection electrodes CE. To accomplish this, the third touch insulating layer TINS3 may be formed as an inorganic layer, in other words, a silicon nitride layer, a silicon oxynitride layer, a silicon oxide layer, a titanium oxide layer, or an aluminum oxide layer. Alternatively, the third touch insulating layer TINS3 may be formed as an organic layer made of an acrylic resin, an epoxy resin, a phenolic resin, a polyamide resin, a polyimide resin, or the like.

A plurality of color filter layers CFL may be formed on the touch sensing unit TSU. As an example, the color filter layers CFL including red, blue, and green color filters may be disposed and formed in a planar shape on the third touch insulating layer TINS3.

The code arrangement unit PIU including a plurality of code patterns CP patterned in a position code shape and a pattern protection layer ITN covering and shielding the plurality of code patterns CP is formed on the touch sensing unit TSU on which the color filter layers CFL are formed.

For example, the code arrangement unit PIU includes the reflective layer IRF formed in the front surface direction of the touch sensing unit TSU, the transparent insulating layer FF disposed in the front surface direction of the reflective layer IRF and transmitting the light applied in the front surface direction and the light reflected from the reflective layer IRF therethrough, the code patterns CP formed on the transparent insulating layer FF, and the pattern protection layer ITN.

The reflective layer IRF including organic or inorganic material layers having different refractive indices is formed on the touch sensing unit TSU on which the color filter layers CFL are formed. The reflective layer IRF may cover the color filter layers CFL.

The reflective layer IRF has a shape corresponding to image non-display areas, in other words, image non-display areas in which the touch electrodes SEN are disposed, and may be formed in a front surface direction of the touch electrodes SEN. Accordingly, the reflective layer IRF may have a mesh shape or a net shape in a plan view in the image non-display areas such that it does not overlap the emission areas of the respective sub-pixels and that it surrounds the peripheries of the emission areas displaying the image.

The transparent insulating layer FF is formed in the front surface direction of the reflective layer IRF to cover the entirety of the reflective layer IRF. The transparent insulating layer FF may be formed on the front surface of the reflective layer IRF to cover all of the color filter layers CFL as well as the reflective layer IRF. Alternatively, the transparent insulating layer FF may be formed to cover the front surface of the reflective layer IRF to correspond to a front surface shape of the reflective layer IRF. The transparent insulating layer FF may be adhered to the reflective layer IRF by the adhesive layer RBF. Here, the transparent insulating layer FF may be formed as a silicon nitride layer, a silicon oxynitride layer, a silicon oxide layer, a titanium oxide layer, or an aluminum oxide layer.

A light blocking member is applied onto a front surface of the transparent insulating layer FF, and is patterned in a preset planar code shape to be formed as the code patterns CP. For example, the light blocking member applied onto the transparent insulating layer FF may be subjected to exposing and patterning processes using a mask to be formed as the code patterns CP in preset code pattern formation areas. In addition, the code patterns CP may also be formed by an inkjet printing process or a gravure printing process in addition to the patterning process. In this case, the code patterns CP may have widths that are the same as or greater than widths of the driving electrodes TE, the sensing electrodes RE, and the dummy electrodes DE formed in the touch sensing unit TSU positioned in a rear surface direction of the code patterns CP. In other words, the code patterns CP may have widths that are the same as or greater than widths of the driving electrodes TE, the sensing electrodes RE, and the dummy electrodes DE disposed below the code patterns CP.

The light blocking member patterned as the code patterns CP may be made of materials including an infrared or ultraviolet absorbing material. For example, the light blocking member may be made of a material including an inorganic or organic pigment. Here, the inorganic pigment may be a pigment including at least one of carbon black, cyanine, polymethine, anthraquinone, and phthalocyanine-based compounds. On the other hand, the organic pigment may include at least one of lactam black, perylene black, and aniline black, but is not limited thereto.

The pattern protection layer ITN covering and shielding the plurality of code patterns CP is formed on the front surface of the transparent insulating layer FF as well as the plurality of code patterns CP.

The pattern protection layer ITN is a shielding layer for preventing deterioration of the plurality of code patterns CP, in other words, chemical component changes and changes over time in the code patterns. The pattern protection layer ITN may include a plurality of inorganic layers that are alternately stacked. For example, the pattern protection layer ITN may be formed as multiple layers in which one or more inorganic layers of a silicon nitride layer, a silicon oxynitride layer, a silicon oxide layer, a titanium oxide layer, and an aluminum oxide layer are alternately stacked. Such a pattern protection layer ITN may serve to planarize a step formed due to the plurality of code patterns CP. Here, the pattern protection layer ITN may also be formed by an inkjet printing process or a gravure printing process.

An adhesive layer to which an adhesive material is applied may be formed on the code arrangement unit PIU in which the plurality of code patterns CP are shielded by the pattern protection layer ITN, and the front surface protection cover UTG may be attached to the front surface of the display unit DU including the pattern protection layer ITN by the adhesive layer. Here, the pattern protection layer ITN covering and shielding the plurality of code patterns CP is formed, and it is thus possible to prevent the plurality of code patterns CP from being deteriorated by a separate adhesive material or the like.

Figure 13:
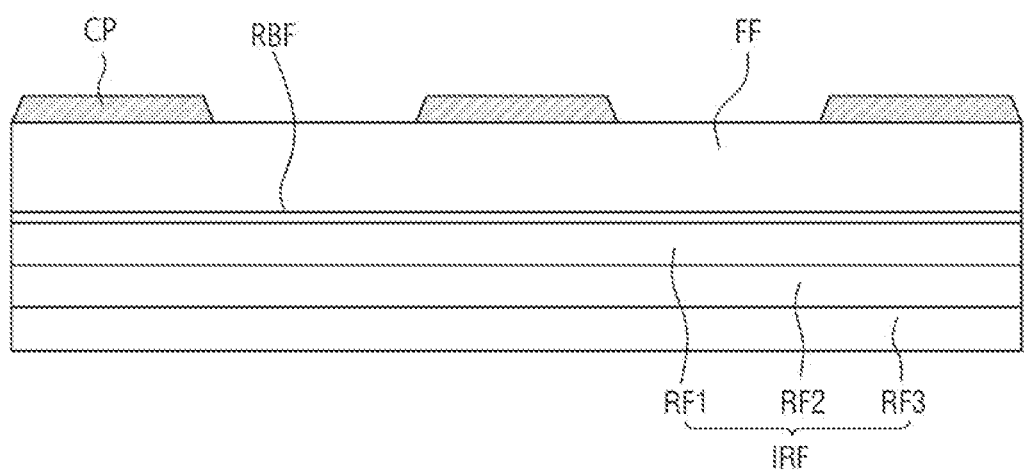
FIG. 13 is a cross-sectional view illustrating a cross section, taken along line A-A', of the code arrangement unit of FIG. 8 according to a second embodiment of the present disclosure.

FIG. 13 is a cross-sectional view illustrating a cross section, taken along line A-A', of the code arrangement unit of FIG. 8 according to a second embodiment of the present disclosure.

Referring to FIG. 13, the reflective layer IRF of the code arrangement unit PIU disposed in the front surface direction of the touch sensing unit TSU and reflects light applied in a front surface direction thereof at an angle of reflection according to an angle of incidence. To accomplish this, the reflective layer IRF may include a plurality of organic or inorganic material layers RF1, RF2 and RF3 having different refractive indices or may be formed as a plurality of layers in which organic and inorganic material layers RF1 to RF3 having different refractive indices are combined with each other. As an example, the reflective layer IRF may include one or more inorganic material layers of a silicon nitride layer, a silicon oxynitride layer, a silicon oxide layer, a titanium oxide layer, and an aluminum oxide layer, and one or more organic material layers made of an acrylic resin, an epoxy resin, a phenolic resin, a polyamide resin, a polyimide resin.

The reflective layer IRF has a shape corresponding to image non-display areas, in other words, image non-display areas in which the touch electrodes SEN are disposed, and may be formed in a front surface direction of the touch electrodes SEN. Accordingly, the reflective layer IRF may be formed in a mesh shape or a net shape in plan view in the image non-display areas such that is does not overlap the emission areas of the respective sub-pixels and that is surrounds the peripheries of the emission areas displaying the image. Furthermore, the plurality of organic or inorganic material layers RF1, RF2 and RF3 may be sequentially stacked.

Thereafter, the transparent insulating layer FF is disposed in the front surface direction of the reflective layer IRF and transmits light applied in a front surface direction and light reflected from the reflective layer IRF therethrough. The transparent insulating layer FF may be adhered and attached in the front surface direction of the reflective layer IRF by the adhesive layer RBF. Likewise, the transparent insulating layer FF may include an inorganic material layer or may include a transparent layer or sheet.

As described above, as the distance ph between the surface of the reflective layer IRF and the code patterns CP becomes smaller than at least one width pw of the code patterns CP, the generation of the ghost images due a reflection of the code patterns CP may be further reduced or be minimized. Accordingly, the distance ph between the surface of the reflective layer IRF and the code patterns CP may be equal to or less than 55% of at least one width pw of the code patterns CP. To accomplish this, the sum of a height (or a thickness) of the transparent insulating layer FF and a height (or a thickness) of the adhesive layer RBF may be equal to or less than 55% of one width pw of the code patterns CP.

Figure 14:
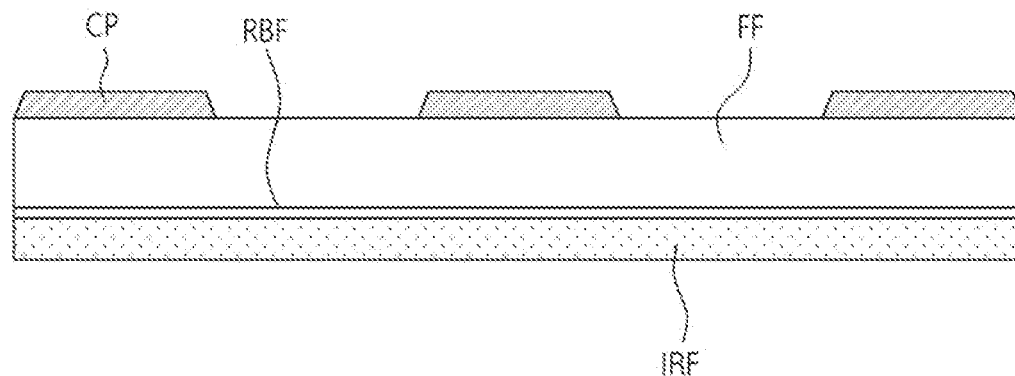
FIG. 14 is a cross-sectional view illustrating a cross section, taken along line A-A', of the code arrangement unit of FIG. 8 according to a third embodiment of the present disclosure.

FIG. 14 is a cross-sectional view illustrating a cross section, taken along line A-A', of the code arrangement unit of FIG. 8 according to a third embodiment of the present disclosure.

Referring to FIG. 14, the reflective layer IRF of the code arrangement unit PIU disposed in the front surface direction of the touch sensing unit TSU and reflects light applied in a front surface direction thereof at an angle of reflection according to an angle of incidence. To accomplish this, the reflective layer IRF may include at least one reflective sheet coated with at least one reflective member made of a metal or a chemical material or may be formed as at least one metal material layer.

The reflective layer IRF may be formed in a mesh shape or a net shape in a plan view in the image non-display areas such that it does not overlap the emission areas of the respective sub-pixels and that it surrounds the peripheries of the emission areas displaying the image. The transparent insulating layer FF is disposed in the front surface direction of the reflective layer IRF and transmits light applied in a front surface direction and light reflected from the reflective layer IRF therethrough.

To minimize the amount of reflected images of the code patterns CP reflected from the surface of the reflective layer IRF, the distance ph between the surface of the reflective layer IRF and the code patterns CP may be equal to or less than 55% of at least one width pw of the code patterns CP. To accomplish this, the sum of a height (or a thickness) of the transparent insulating layer FF and a height (or a thickness) of the adhesive layer RBF may be equal to or less than 55% of one width pw of the code patterns CP.

The transparent insulating layer FF is formed in the front surface direction of the reflective layer IRF to cover the entirety of the reflective layer IRF. The transparent insulating layer FF may be formed on the front surface of the reflective layer IRF to cover all of the color filter layers CFL as well as the reflective layer IRF. Alternatively, the transparent insulating layer FF may be formed to cover the front surface of the reflective layer IRF to correspond to a front surface shape of the reflective layer IRF.

Figure 15:
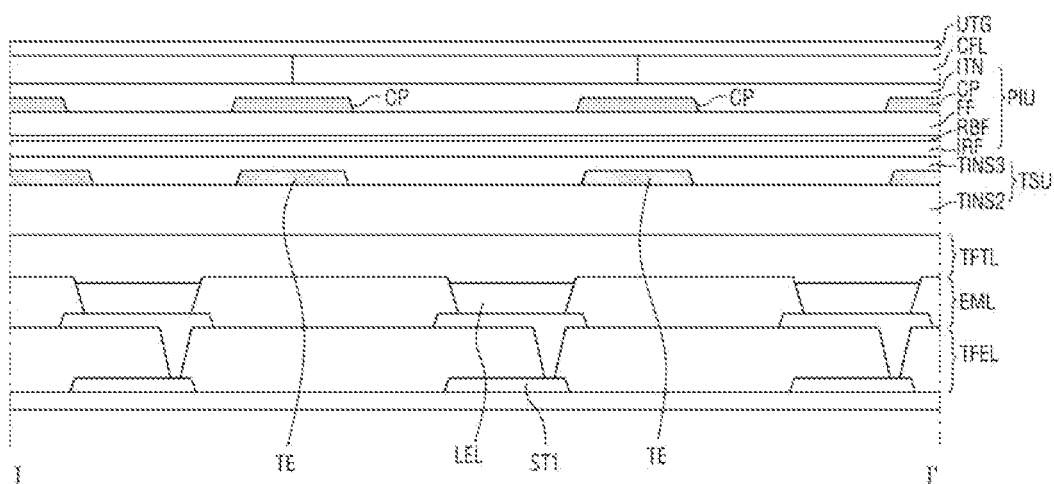
FIG. 15 is a cross-sectional view illustrating cross sections, taken along line I-I', of a display unit, a touch sensing unit, and a code arrangement unit according to a fourth embodiment of the present disclosure in a simplified block form.

FIG. 15 is a cross-sectional view illustrating cross sections, taken along line I-I', of a display unit, a touch sensing unit, and a code arrangement unit according to a fourth embodiment of the present disclosure in a simplified block form.

Referring to FIG. 15, the code arrangement unit PIU may be formed in the front surface direction of the touch sensing unit TSU before the color filter layers CFL are formed, and the color filter layers CFL may be formed in a front surface direction of the code arrangement unit PIU. In other words, the code arrangement unit PIU may be formed on the front surface of the touch sensing unit TSU, and the color filter layers CFL may be then formed in the front surface direction of the code arrangement unit PIU. This way, the color filter layer CFL may be disposed between the touch sensing unit TSU and the front surface protection cover UTG.

The code arrangement unit PIU formed on the front surface of the touch sensing unit TSU includes the reflective layer IRF, the transparent insulating layer FF disposed in the front surface direction of the reflective layer IRF, the code patterns CP formed on the transparent insulating layer FF, and the pattern protection layer ITN shielding the code patterns CP.

As illustrated in FIG. 15, the code arrangement unit PIU may be formed at a layer between the touch sensing unit TSU and the color filter layers CFL, and the reflective layer IRF and the transparent insulating layer FF may be formed in a mesh shape or a net shape in plan view in the image non-display areas so as not to overlap the emission areas of the respective sub-pixels.

Figure 16:
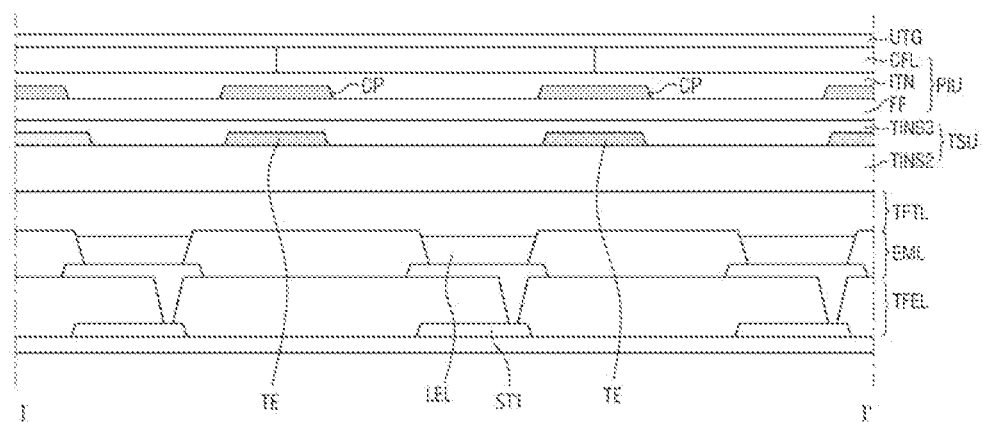
FIG. 16 is a cross-sectional view illustrating cross sections, taken along line I-I', of a display unit, a touch sensing unit, and a code arrangement unit according to a fifth embodiment of the present disclosure in a simplified block form.

FIG. 16 is a cross-sectional view illustrating cross sections, taken along line I-I', of a display unit, a touch sensing unit, and a code arrangement unit according to a fifth embodiment of the present disclosure in a simplified block form. In addition, FIG. 17 is an enlarged cross-sectional view illustrating cross sections, taken along line I-I', of the touch sensing unit and the code arrangement unit of FIG. 15.

Figure 17:
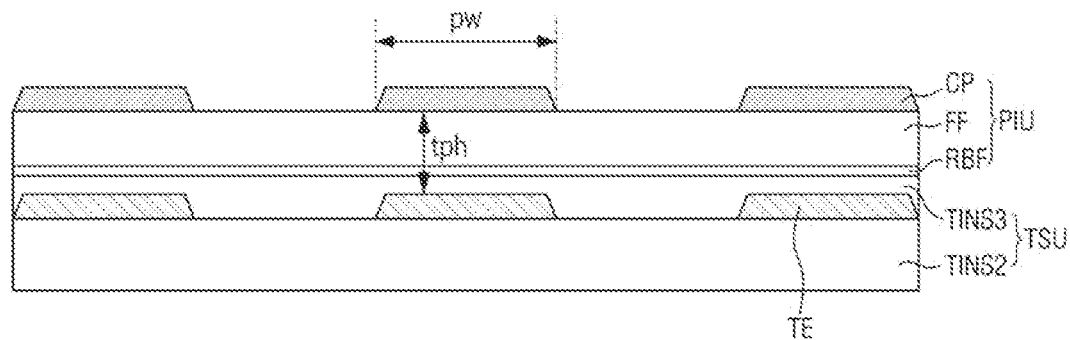
FIG. 17 is an enlarged cross-sectional view illustrating cross sections, taken along line I-I', of the touch sensing unit and the code arrangement unit of FIG. 15.

Referring to FIGS. 16 and 17, the code arrangement unit PIU may be formed integrally with the touch sensing unit TSU in the front surface direction of the touch sensing unit TSU, and the color filter layers CFL may be then formed in a front surface direction of the code arrangement unit PIU. In this case, the code arrangement unit PIU may use the touch electrodes SEN (e.g., the driving electrodes TE) of the touch sensing unit TSU as a rear reflective surface without the reflective layer IRF.

The code arrangement unit PIU includes the transparent insulating layer FF, the code patterns CP, and the pattern protection layer ITN without the reflective layer IRF as a structure for using the touch electrodes SEN of the touch sensing unit TSU as the rear reflective surface. In other words, the transparent insulating layer FF is disposed in the front surface direction of the touch electrodes SEN formed in the touch sensing unit TSU, and transmits light applied in a front surface direction and light reflected from the touch electrodes SEN therethrough.

The code patterns CP are formed on the transparent insulating layer FF based on the position code shape. In addition, the pattern protection layer ITN covers and shields the plurality of code patterns CP.

Referring to FIG. 17, in the structure using the touch electrodes SEN of the touch sensing unit TSU as the reflective surface, in an effort to minimize the generation of reflected images of the code patterns CP that are reflected from surfaces of the touch electrodes SEN, a distance tph between the surface of the touch electrodes SEN (e.g., the driving electrodes TE) and the code patterns CP may be equal to or less than 55% of at least one width pw of the code patterns CP. To accomplish this, a height (or a thickness) of the transparent insulating layer FF may be equal to or less than 55% of any one width pw of the code patterns CP. Thereafter, the color filter layers CFL may be formed in the front surface direction of the code arrangement unit PIU in which the pattern protection layer ITN is formed.

In concluding the detailed description, those skilled in the art will appreciate that many variations and modifications can be made to the embodiments set forth herein without substantially departing from the principles of the present disclosure. Therefore, the embodiments of the present disclosure are used in a generic and descriptive sense and not for purposes of limitation.

What is claimed is:

1. A display device comprising:
   a display unit including a plurality of sub-pixels;
   a touch sensing unit formed on the display unit and configured to sense a touch position;
   a code arrangement unit disposed on the touch sensing unit, wherein the code arrangement unit includes code patterns; and
   a surface protection cover disposed on the code arrangement unit,
   wherein a distance between the code patterns and a reflective surface formed below the code patterns is equal to or less than 55% of one width of one of the code patterns.

2. The display device of claim 1, wherein the code arrangement unit includes:
   a reflective layer constituting the reflective surface and configured to reflect light applied from above the reflective layer; and
   a transparent insulating layer disposed on the reflective layer and configured to transmit light applied from above the transparent insulating layer and light reflected from the reflective layer therethrough, and
   the code patterns are formed on the transparent insulating layer with a preset pattern.

3. The display device of claim 2, wherein the code arrangement unit further includes a pattern protection layer covering the code patterns, and
   the pattern protection layer includes at least one single-layer inorganic layer, includes a plurality of inorganic layers that are alternately stacked, includes at least one organic layer, or includes a plurality of organic layers that are stacked.

4. The display device of claim 2, wherein the code arrangement unit includes first and second grid reference lines orthogonal to each other and intersection points where the first and second grid reference lines intersect with each other, and
   the code patterns are disposed in any direction from the intersection points.

5. The display device of claim 2, wherein a height or a thickness of the transparent insulating layer is equal to or less than 55% of one width of one of the code patterns.

6. The display device of claim 2, wherein the transparent insulating layer is adhered to a front surface of the reflective layer constituting the reflective surface by an adhesive layer, and
   a sum of a height or a thickness of the transparent insulating layer and a height or a thickness of the adhesive layer is equal to or less than 55% of one width of one of the code patterns.

7. The display device of claim 2, wherein the reflective layer constituting the reflective surface includes a liquid crystal layer including a plurality of liquid crystals that have the same or different refractive indices.

8. The display device of claim 2, wherein the reflective layer constituting the reflective surface includes a plurality of organic or inorganic material layers having different refractive indices, includes a plurality of layers in which organic and inorganic material layers having different refractive indices are combined with each other, includes at least one reflective sheet coated with a reflective member made of a metal or a chemical material, or includes at least one metal material layer.

9. The display device of claim 2, wherein the reflective layer constituting the reflective surface has a mesh shape or a net shape in a plan view in image non-display areas of the display unit such that is does not overlap emission areas of the sub-pixels formed in the display unit and that it surrounds the peripheries of the emission areas of the sub-pixels.

10. The display device of claim 1, wherein the code arrangement unit includes:
    a transparent insulating layer disposed on touch electrodes formed in the touch sensing unit and configured to transmit light applied from above and light reflected from the touch electrodes therethrough.

11. The display device of claim 10, wherein a distance between surfaces of the touch electrodes and the code patterns is equal to or less than 55% of one width of one of the code patterns.

12. The display device of claim 11, wherein a height or a thickness of the transparent insulating layer is equal to or less than 55% of one width of one of the code patterns.

13. The display device of claim 10, wherein the code arrangement unit further includes a pattern protection layer covering the code patterns, and
    the pattern protection layer includes at least one single-layer inorganic layer, a plurality of inorganic layers that are alternately stacked, at least one organic layer or a plurality of organic layers that are stacked.

14. A position input system comprising:
a display device for displaying an image; and
a position input device for inputting position coordinate data to the display device,
wherein the display device includes:
a display unit including a plurality of sub-pixels;
a touch sensing unit formed on the display unit and configured to sense a user's touch position;
a code arrangement unit including code patterns disposed on the touch sensing unit; and
a surface protection cover disposed on the code arrangement unit, and
a distance between the code patterns and a reflective surface formed below the code patterns is equal to or less than 55% of one width of one of the code patterns.

15. The position input system of claim 14, wherein the code arrangement unit includes:
a reflective layer constituting the reflective surface and configured to reflect light applied from above the reflective layer; and
a transparent insulating layer disposed on the reflective layer and configured to transmit light applied from above the transparent insulating layer and light reflected from the reflective layer therethrough, and
the code patterns are formed on the transparent insulating layer with a preset pattern.

16. The position input system of claim 15, wherein the reflective layer constituting the reflective surface has a mesh shape or a net shape in a plan view in image non-display areas of the display unit such that is does not overlap emission areas of the sub-pixels formed in the display unit and that it surrounds the peripheries of the emission areas of the sub-pixels.

17. The position input system of claim 15, wherein the code arrangement unit further includes a pattern protection layer covering the code patterns, and
the pattern protection layer includes at least one single-layer inorganic layer, a plurality of inorganic layers that are alternately stacked, at least one organic layer, or a plurality of organic layers that are stacked.

18. The position input system of claim 14, wherein the code arrangement unit includes:
a transparent insulating layer disposed on touch electrodes formed in the touch sensing unit and configured to transmit light applied from above and light reflected from the touch electrodes therethrough.

19. A display device comprising:
a display unit including a plurality pixels;
a touch sensing unit formed on the display unit and configured to sense a touch position;
a code arrangement unit disposed on the touch sensing unit, wherein the code arrangement unit includes code patterns; and
a surface protection cover disposed on the code arrangement unit,
wherein a distance between the code patterns and a reflective surface formed below the code patterns in a first direction is equal to or less than 55% of one width of one of the code patterns, the width of the one code pattern being measured in a second direction perpendicular to the first direction.

20. An electronic device including a display device,
wherein the display device comprises:
a display unit including a plurality of sub-pixels;
a touch sensing unit formed on the display unit and configured to sense a touch position;
a code arrangement unit disposed on the touch sensing unit, wherein the code arrangement unit includes code patterns; and
a surface protection cover disposed on the code arrangement unit,
wherein a distance between the code patterns and a reflective surface formed below the code patterns is equal to or less than 55% of one width of one of the code patterns.

* * * * *